United States Patent
Suzuki et al.

(10) Patent No.: US 11,066,122 B2
(45) Date of Patent: Jul. 20, 2021

(54) CONTROL DEVICE AND CONTROL SYSTEM INCLUDING CONTROL DEVICE

(71) Applicant: Shimano Inc., Osaka (JP)

(72) Inventors: Takafumi Suzuki, Osaka (JP); Makoto Usui, Osaka (JP)

(73) Assignee: Shimano Inc., Osaka (JP)

( * ) Notice: Subject to any disclaimer, the term of this patent is extended or adjusted under 35 U.S.C. 154(b) by 82 days.

(21) Appl. No.: 16/426,688

(22) Filed: May 30, 2019

(65) Prior Publication Data

US 2020/0377167 A1 Dec. 3, 2020

(51) Int. Cl.

| | | |
|---|---|---|
| B62K 25/04 | (2006.01) | |
| B60W 10/10 | (2012.01) | |
| B60W 10/18 | (2012.01) | |
| B60W 10/04 | (2006.01) | |
| B60W 50/00 | (2006.01) | |
| B62M 6/45 | (2010.01) | |
| B62M 25/08 | (2006.01) | |
| B62L 3/00 | (2006.01) | |
| B62J 1/08 | (2006.01) | |
| B62J 99/00 | (2020.01) | |
| B60W 10/22 | (2006.01) | |
| B62J 6/01 | (2020.01) | |
| B62J 50/20 | (2020.01) | |

(52) U.S. Cl.
CPC ............. *B62K 25/04* (2013.01); *B60W 10/04* (2013.01); *B60W 10/10* (2013.01); *B60W 10/18* (2013.01); *B60W 10/22* (2013.01); *B60W 50/00* (2013.01); *B62J 1/08* (2013.01); *B62J 6/01* (2020.02); *B62J 99/00* (2013.01); *B62L 3/00* (2013.01); *B62M 6/45* (2013.01); *B62M 25/08* (2013.01); *B60W 2050/007* (2013.01); *B60W 2300/36* (2013.01); *B60W 2556/00* (2020.02); *B60W 2710/08* (2013.01); *B60W 2710/10* (2013.01); *B60W 2710/18* (2013.01); *B60W 2710/22* (2013.01); *B62J 50/20* (2020.02)

(58) Field of Classification Search
CPC ......... B62K 25/04; B62M 6/45; B62M 25/08; B62L 3/00; B62J 50/20; B62J 6/01; B62J 1/08; B62J 99/00; B60W 2556/00; B60W 2710/22; B60W 2300/36; B60W 2050/007; B60W 2710/18; B60W 2710/08; B60W 2710/10; B60W 10/18; B60W 10/04; B60W 10/22; B60W 10/10; B60W 50/00

See application file for complete search history.

(56) References Cited

U.S. PATENT DOCUMENTS

| | | |
|---|---|---|
| 10,029,754 B2 | 7/2018 | Watarai et al. |
| 10,252,772 B2 | 4/2019 | Sala |

(Continued)

*Primary Examiner* — Rodney A Butler

(74) *Attorney, Agent, or Firm* — Global IP Counselors, LLP

(57) ABSTRACT

A control device is provided for a human-powered vehicle. The control device is basically provided with a controller. The controller is configured to be connected to at least one component of the human-powered vehicle such that the controller is free from executing normal activation of the at least one component in accordance to a first input in a first mode. The controller is configured to operate at least one of an actuator and an indicator in accordance to the first input in a second mode. The first mode is switched into the second mode in accordance to a second input different from the first input.

20 Claims, 11 Drawing Sheets

(56) References Cited

U.S. PATENT DOCUMENTS

| | | | |
|---|---|---|---|
| 2002/0089143 A1* | 7/2002 | Horiuchi | B62M 25/045 280/261 |
| 2009/0192673 A1* | 7/2009 | Song | G06F 3/04847 701/37 |
| 2014/0087901 A1 | 3/2014 | Shipman et al. | |
| 2014/0168130 A1* | 6/2014 | Hirai | G10L 15/00 345/173 |
| 2018/0043968 A1 | 2/2018 | Sala | |
| 2019/0241236 A1* | 8/2019 | Lin | B62M 9/122 |
| 2020/0062227 A1* | 2/2020 | Tohara | B60T 8/1706 |
| 2020/0122629 A1* | 4/2020 | Kojima | B60Q 1/50 |
| 2020/0247504 A1* | 8/2020 | Ho | B62K 23/06 |

* cited by examiner

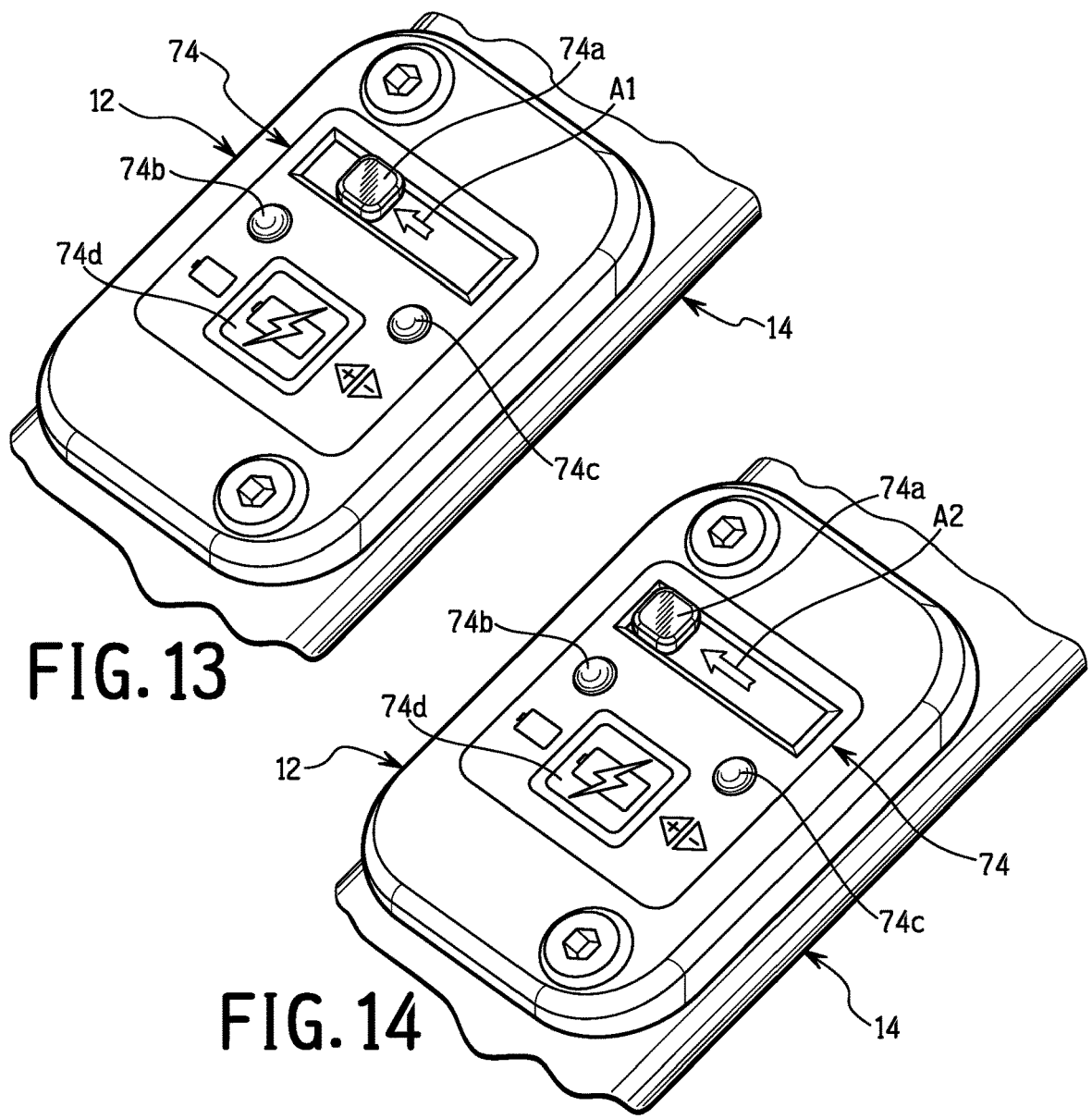
FIG. 13
FIG. 14
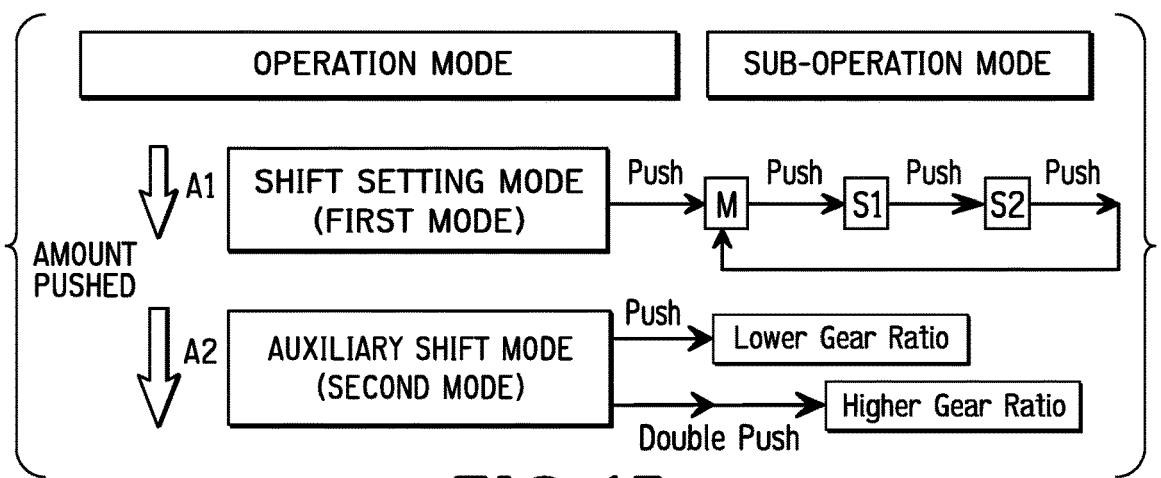
FIG. 15

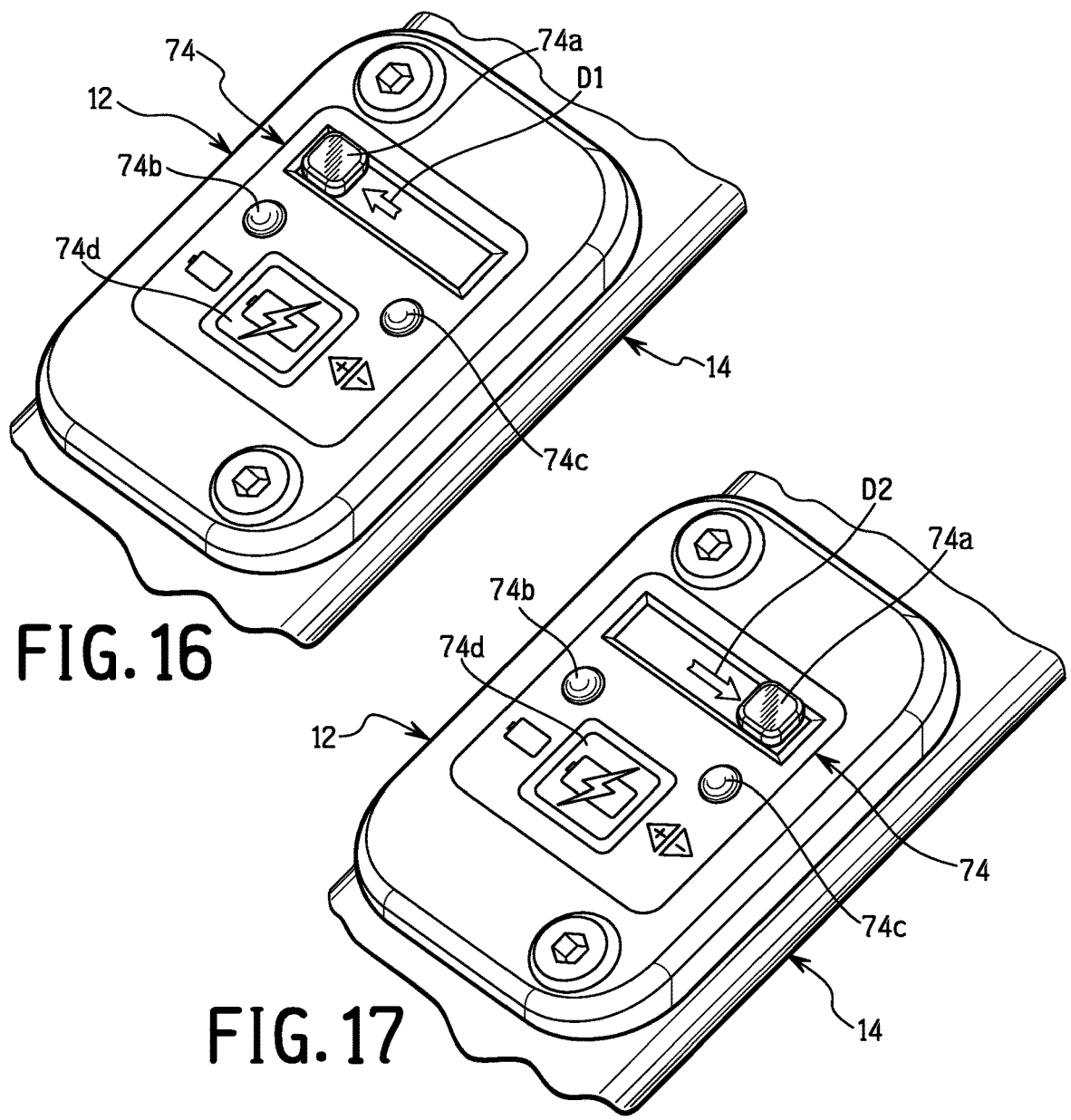
FIG. 16
FIG. 17
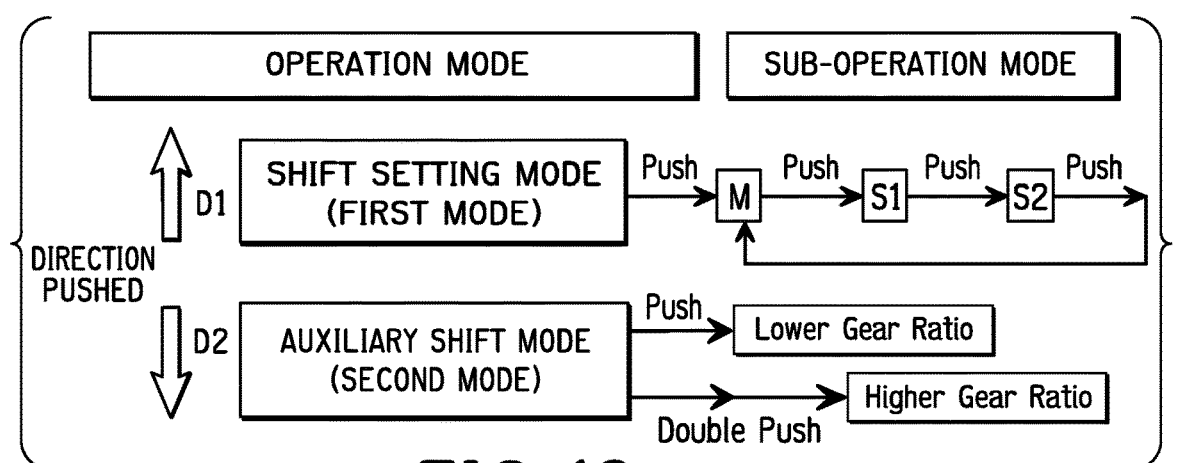
FIG. 18

CONTROL DEVICE AND CONTROL SYSTEM INCLUDING CONTROL DEVICE

BACKGROUND

Technical Field

This disclosure generally relates to a control device and a control system including the control device. More specifically, the present disclosure relates to a control device and a control system for controlling components a human-powered vehicle.

Background Information

Conventional control systems control various components of a human-powered vehicle based on operation of an operating device mounted on the human-powered vehicle. In a conventional controller, for example, the rider of a human-powered vehicle operates an operating device in accordance with the surrounding environment of the human-powered vehicle to control various components of the human-powered vehicle. One example of a control system for a human-powered vehicle (e.g., a bicycle) is disclosed in U.S. Pat. No. 10,252,772 B2. In this patent, the control system includes a primary controller of a first derailleur also controls a second derailleur.

SUMMARY

In a human-powered vehicle, it is desirable that rider be able to control the human-powered vehicle for a particular riding condition. Generally, the present disclosure is directed to various features of a control device and a control system including the control device. In one feature, a control device is provided with a controller that is configured to operate an actuator in a first mode, and operate another component in a second mode.

In view of the state of the known technology and in accordance with a first aspect of the present disclosure, a control device is provided for a human-powered vehicle. The control device basically comprises a controller. The controller is configured to be connected to at least one component of the human-powered vehicle such that the controller is free from executing normal activation of the at least one component in accordance to a first input in a first mode. The controller is configured to operate at least one of an actuator and an indicator in accordance to the first input in a second mode. The first mode is switched into the second mode in accordance to a second input different from the first input.

With the control system according to the first aspect, it is possible to use a first input that is not a normal activation input to activate of the at least one component in a first mode and to operate at least one of an actuator and an indicator in accordance to the first input in a second mode.

In accordance with a second aspect of the present disclosure, the control device according to the first aspect further comprises a user interface, and the controller is configured to switch from the first mode into the second mode in accordance to the second input applied to the user interface.

With the information system according to the second aspect, it is possible to easily switch from the first mode into the second mode using a user interface.

In accordance with a third aspect of the present disclosure, the control device according to the second aspect is configured so that the first input is applied to the user interface with a first operating duration, and the second input is applied to the user interface with a second operating duration different from the first operating duration.

With the control system according to the third aspect, it is possible to easily perform two different functions by operating the user interface for different durations.

In accordance with a fourth aspect of the present disclosure, the control device the according to the second aspect is configured so that the first input is applied to the user interface with a movement in the first operating direction, and the second input is applied to the user interface with a movement in the second operating direction different from the first operating direction.

With the control system according to the fourth aspect, it is possible to easily perform two different functions by operating the user interface in different directions.

In accordance with a fifth aspect of the present disclosure, the control device according to the second aspect is configured so that the first input is applied to the user interface with a first operating amount, and the second input is applied to the user interface with a second operating amount different from the first operating amount.

With the control system according to the fifth aspect, it is possible to easily perform two different functions using the user interface by applying different operating amount.

In accordance with a sixth aspect of the present disclosure, the control device according to the first aspect is configured so that the controller is configured to switch from the first mode to the second mode upon detecting a predetermined condition of the human powered vehicle.

With the control system according to the sixth aspect, it is possible for the controller to automatically select the appropriate mode of operating based on a predetermined condition of the human powered vehicle.

In accordance with a seventh aspect of the present disclosure, the control device according to the sixth aspect further comprises a user interface, and the actuator is operated in accordance to an operation of the user interface in the second mode.

With the control system according to the seventh aspect, it is possible to easily operate the actuator using a user interface in the second mode.

In accordance with an eighth aspect of the present disclosure, the control system comprising the control device according to any one of the first to seventh aspects and further comprises the at least one component of the human-powered vehicle.

With the control system according to the eighth aspect, it is possible to provide a control system specifically designed to control at least one component of the human-powered vehicle.

In accordance with a ninth aspect of the present disclosure, the control system according to the eighth aspect is configured so that the at least one component includes one of a transmission, a suspension, a seatpost assembly, a brake device, and a drive assist unit that is operated by the actuator.

With the control system according to the ninth aspect, it is possible to control an actuator for operating one of a transmission, a suspension, a seatpost assembly, a brake device, and a drive assist unit.

In accordance with a tenth aspect of the present disclosure, the control system according to the ninth aspect is configured so that the at least one component includes the transmission which includes a chain guide that is operated by the actuator.

With the control system according to the tenth aspect, it is possible to change a gear ratio of a chain type drivetrain.

In accordance with an eleventh aspect of the present disclosure, the control system according to the ninth aspect is configured so that the at least one component includes the suspension which includes a valve that is operated by the actuator.

With the control system according to the eleventh aspect, it is possible to control the stiffness of the suspension to a suitable level for improving a riding experience of a rider.

In accordance with a twelfth aspect of the present disclosure, the control system according to the ninth aspect is configured so that the at least one component includes the seatpost assembly which includes a valve that is operated by the actuator.

With the control system according to the twelfth aspect, it is possible to control a height of a seat to a suitable level for improving a riding experience of a rider.

In accordance with a thirteenth aspect of the present disclosure the control system according to any one of the ninth to twelfth aspects is configured so that the actuator is provided to the one of the transmission, the suspension, the seatpost assembly, the brake device, and the drive assist unit.

With the control system according to the thirteenth aspect, it is possible to simplify the control system by providing the actuator on the one of the transmission, the suspension, the seatpost assembly, the brake device, and the drive assist unit that is being controlled.

In accordance with a fourteenth aspect of the present disclosure, the control system according to the eighth aspect is configured so that the at least one component includes one of a lamp and a display device.

With the control system according to the fourteenth aspect, it is possible to easily control one of a lamp and a display device.

In accordance with a fifteenth aspect of the present disclosure, the control system according to the fourteenth aspect is configured so that the indicator is provided to one of the lamp and the display device.

With the control system according to the fifteenth aspect, it is possible to notify a user or rider of a status of a component of the human-powered vehicle using one of the lamp and the display device.

In accordance with a sixteenth aspect of the present disclosure, the control system according to any one of the eighth to fifteenth aspects further comprises an additional control device configured to operate the at least one component in accordance to a user input while in the first mode, the user input is different from the first and second inputs. The controller of the control device is configured to switch the first mode to the second mode upon detecting disconnection between the additional control device and the at least one component.

With the control system according to the sixteenth aspect, it is possible to easily control the at least one component during normal riding conditions.

In accordance with a seventeenth aspect of the present disclosure, the control system according to any one of the eighth to sixteenth aspects further comprises a wireless communication unit electrically connected to the controller of the control device.

With the control system according to the seventeenth aspect, it is possible for the controller to communicate with other components without the need of connecting wires.

In accordance with an eighteenth aspect of the present disclosure, the control system according to any one of the first to seventeenth aspects further comprises a power supply unit electrically connected to the controller of the control device.

With the control system according to the eighteenth aspect, it is possible to easily supply electrical power to the controller.

In accordance with a nineteenth aspect of the present disclosure, the control system according the eighteenth aspect is configured so that the power supply unit is electrically connected to the at least one component.

With the control system according to the nineteenth aspect, it is possible to a common power supply for both the controller and the at least one component.

Also, other objects, features, aspects and advantages of the disclosed control system will become apparent to those skilled in the art from the following detailed description, which, taken in conjunction with the annexed drawings, discloses preferred embodiments of the control system.

BRIEF DESCRIPTION OF THE DRAWINGS

Referring now to the attached drawings which form a part of this original disclosure:

FIG. 13 is a perspective view of the portion of the front frame body that includes the control device of the control system includes the control device of the control system in which the user input device of the control device has been moved by a first operation amount to a first operated position for performing the second input based on the user input device being operated by the first operation amount;

FIG. 14 is a perspective view, similar to FIG. 13, of the portion of the front frame body that includes the control device of the control system in which the user input device of the control device has been moved by a second operation amount to a second operated position for performing the second input based on the user input device being operated by the second operation amount;

FIG. 15 is a schematic diagram of operations performed by the control device illustrated in FIGS. 1 to 6 in which the first and second inputs are performed based on the first and second operation amounts of the user input device;

FIG. 16 is a perspective view of the portion of the front frame body that includes the control device of the control system in which the user input device of the control device has been moved in a first operating direction to a first operated position for performing the first input based on the user input device being operated in the first operating direction;

FIG. 17 is a perspective view, similar to FIG. 16, of the portion of the front frame body that includes the control device of the control system in which a user input device of the control device has been moved in a second operating direction to a second operated position for performing the second input based on the user input device being operated by a second operating direction;

FIG. 18 is a schematic diagram of operations performed by the control device illustrated in FIGS. 1 to 6 in which the first and second inputs are performed based on the first and second operating directions that the user input device is operated.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
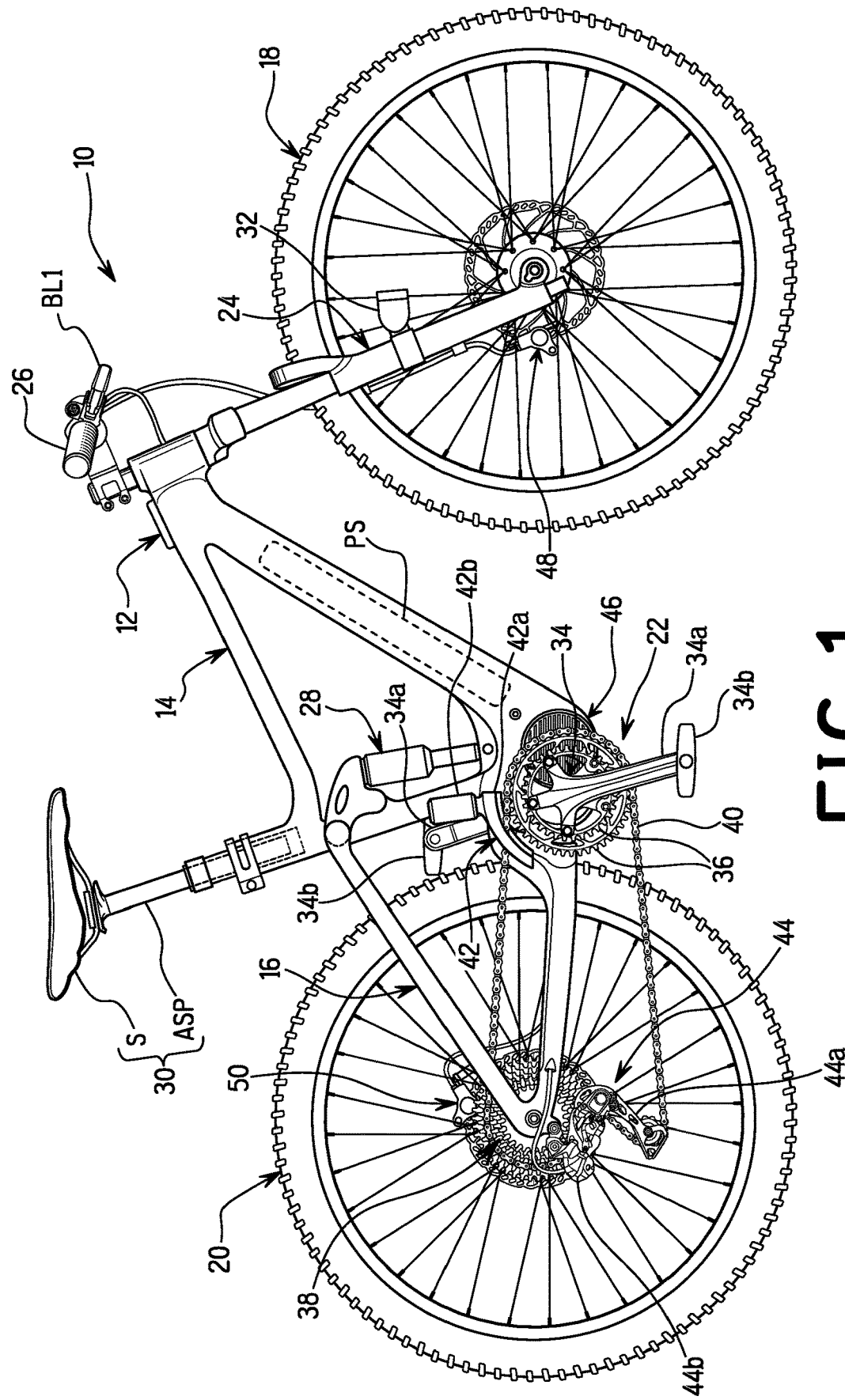
FIG. 1 is a side elevational view of a human-powered vehicle equipped with a control system including a control device in accordance with illustrated embodiments.

Referring initially to FIG. 1, a human-powered vehicle 10 is illustrated that is in accordance with a first embodiment. A control device 12 is provided for the human-powered vehicle 10. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that does not require a license for driving on a public road. The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, and a recumbent bike, and an electric assist bicycle (E-bike). In the embodiments described below, the human-powered vehicle 10 refers to a bicycle. Here, the human-powered vehicle 10 is a bicycle that at least partially uses human power as a driving power for traveling and also selectively uses a vehicle electrically assisting human power. More specifically, in the embodiments described below, the human-powered vehicle 10 is an electric assist bicycle (E-bike). Since the control device 12 is used with a bicycle, the control device 12 can be referred to as a bicycle control device.

Still referring to FIG. 1, the human-powered vehicle 10 (the bicycle 10) has a front frame body 14, a rear frame body 16, a front wheel 18, a rear wheel 20 and a drivetrain 22. The rear frame body 16 is coupled to a rear section of the front frame body 14 such that the rear frame body 16 can pivot freely. A front suspension 24 (i.e., a front suspension fork) is pivotally mounted to a head tube of the front frame body 14. A handlebar 26 is mounted to an upper end of a steerer tube of the front suspension 24. The front wheel 18 is mounted to the lower end of the front suspension 24. The rear wheel 20 is mounted to a rear end of the rear frame body 16. A rear suspension 28 is provided between the front frame body 14 and the rear frame body 16. A seatpost assembly 30 is attached to a seat tube of the front frame body 14. The seatpost assembly 30 includes a height adjustable seatpost ASP and a bicycle saddle or seat S that is mounted on top of the height adjustable seatpost ASP in any suitable manner. A lamp 32 is mounted to the front suspension 24.

Figure 4:
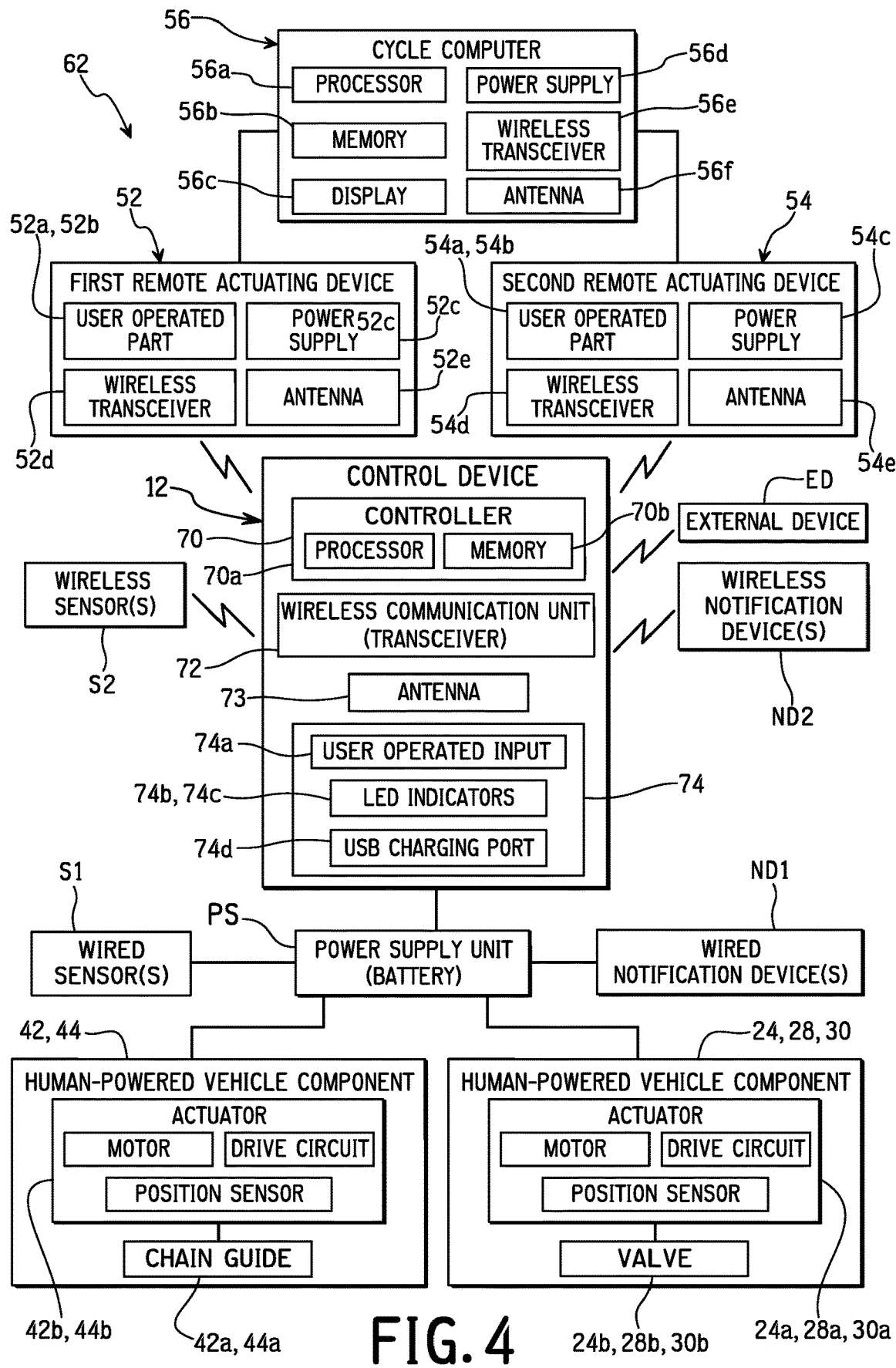
FIG. 4 is a block diagram of a selected components of the block diagram illustrated in FIG. 3.

Referring to FIG. 4, here, the front suspension 24 is an adjustable front suspension. The front suspension 24 includes an actuator 24a that controls a valve 24b for adjusting stiffness which includes locking and unlocking the front suspension 24. The actuator 24a includes, for example, a reversible electric motor, a motor drive circuit and a position sensor. Adjustable front suspensions are known in the bicycle field, and thus, the front suspension 24 will not be discussed in further detail herein. Basically, the control device 12 is configured to control the at least one component that includes the suspension (e.g., the front suspension 24) including the valve 24b that is operated by the actuator 24a. While the human-powered vehicle 10 includes the front suspension 24, the present invention can be applied to human-powered vehicles that do not include a front suspension.

Still referring to FIG. 4, here, the rear suspension 28 is an adjustable rear suspension. The rear suspension 28 includes an actuator 28a that controls a valve 28b for adjusting stiffness which includes locking and unlocking the rear suspension 28. The actuator 28a includes, for example, a reversible electric motor, a motor drive circuit and a position sensor. Adjustable rear suspensions are known in the bicycle field, and thus, the rear suspension 28 will not be discussed in further detail herein. Basically, the control device 12 is configured to control the at least one component that includes the suspension (e.g., the rear suspension 28) including the valve 28b that is operated by the actuator 28a. While the human-powered vehicle 10 includes the rear suspension 28, the present invention can be applied to human-powered vehicles such as hardtail bicycles that do not include a rear suspension.

Still referring to FIG. 4, here, the seatpost assembly 30 is an adjustable seatpost assembly. The seatpost assembly 30 includes an actuator 30a that controls a valve 30b for adjusting the height of the adjustable seat post ASP. The actuator 30a includes, for example, a reversible electric motor, a motor drive circuit and a position sensor. Adjustable seatpost assemblies are known in the bicycle field, and thus, the seatpost assembly 30 will not be discussed in further detail herein. Basically, the control device 12 is configured to control the at least one component that includes the seatpost assembly 30 including the valve 30b that is operated by the actuator 30a. While the seatpost assembly 30 is used to adjust the height of the seat S, the present invention is not limited to such a seatpost assembly. For example, the present invention can be applied to seatpost assembly that is a rider's posture changing device where a rider's seat/saddle can be change by a linkage, a pantograph, a suspension support or the like.

As seen in FIG. 1, the drivetrain 22 includes a front crank assembly 34, a plurality of front chainrings 36, a plurality of rear sprockets 38 and a chain 40. The front crank assembly 34 includes a pair of crank arms 34a and a pair of pedals 34b. Each of the pedals 34b is rotatably coupled to the distal end of the corresponding one of the crank arms 34a. The human-powered vehicle 10 further includes a front derailleur 42 and a rear derailleur 44.

The front derailleur 42 includes a chain guide 42a that is configured to selectively shift the chain 40 between front chainrings 36. Here, the front derailleur 42 is an electric front derailleur that includes an actuator 42b. The actuator 42b includes, for example, a reversible electric motor, a motor drive circuit and a position sensor. The rear derailleur 44 includes a chain guide 44a that is configured to selectively shift the chain 40 between the rear sprockets 38. Here, the rear derailleur 44 is an electric rear derailleur that includes an actuator 44b. The actuator 44b includes, for example, a reversible electric motor, a motor drive circuit and a position sensor. The front derailleur 42 and the rear derailleur 44 are examples of transmissions. More specifically, the front derailleur 42 and the rear derailleur 44 are examples of gear changing structures or gear changers. The electric front and rear derailleurs are known in the bicycle field, and thus, the front derailleur 42 and the rear derailleur 44 will not be discussed in further detail herein. Basically, the control device 12 is configured to control the at least one component which includes the transmission (e.g., the front derailleur 42 and the rear derailleur 44) including the chain guide 42a or 44a that is operated by the actuator 42b or 44b.

Here, the drivetrain 22 of the human-powered vehicle 10 further includes a drive assist unit 46 that includes an electric motor as actuator for applying a drive assist force to the chain 40 via one of the front chainrings 36. Since drive assist units are well known, the drive assist unit 46 will not be discussed or illustrated in detail herein.

Here, the human-powered vehicle 10 further includes an electric front brake device 48 and an electric rear brake device 50. Each of the front and rear brake devices 48 and 50 is an electrically operated disc brake caliper that has an electric actuator for moving brake pads (not shown) to apply a braking force. The rear brake device 50 is operated in response to the operation of a rear brake operating device BL1. The front brake device 48 is operated in response to the operation of a front brake operating device BL2. Since electric brake devices are well known, the front and rear brake devices 48 and 50 will not be discussed or illustrated in detail herein.

The front suspension 24, the rear suspension 28, the seatpost assembly 30, the lamp 32, the front derailleur 42, the rear derailleur 44, the drive assist unit 46, the front brake device 48, the rear brake device 50 and the cycle computer 56 are each electric components which can be more broadly referred to as components of the human-powered vehicle 10. Since the components are installed on a bicycle, the front suspension 24, the rear suspension 28, the seatpost assembly 30, the lamp 32, the front derailleur 42, the rear derailleur 44, the drive assist unit 46, the front brake device 48, the rear brake device 50, the cycle computer 56 can also be referred to as bicycle components or electric bicycle components. Each of the components 24, 28, 30, 32, 42, 44, 46, 48, 50 and 56 can be considered as a "first human-powered vehicle component", or a "second human-powered vehicle component", or a "third human-powered vehicle component", and so on. In other words, it will be understood that the terms "first", "second", "third" and so on can be used interchangeably to describe each of the components 24, 28, 30, 32, 42, 44, 46, 48, 50 and 56.

Figure 2:
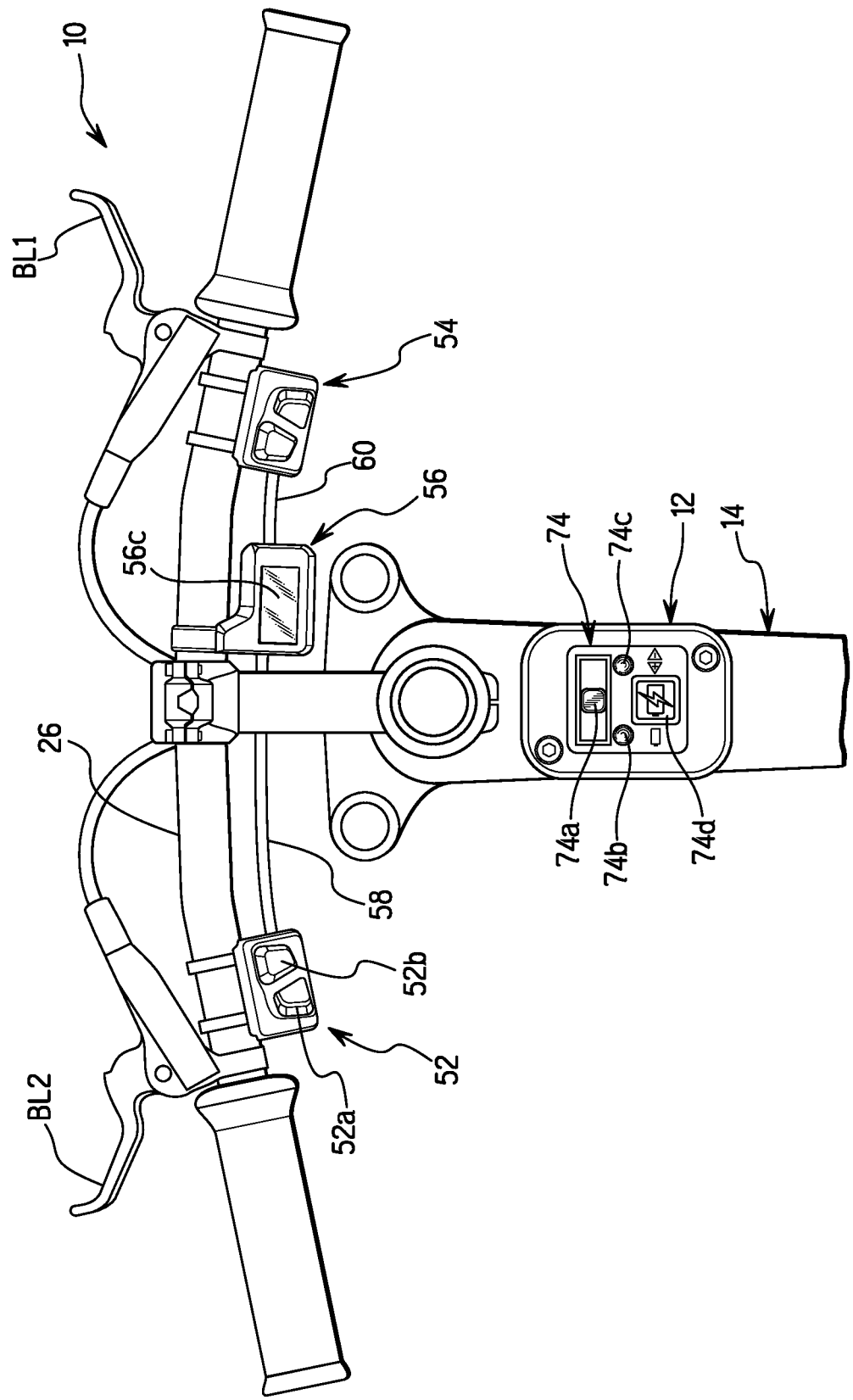
FIG. 2 is a top view of a front portion of the human-powered vehicle illustrated in FIG. 1.

Referring to FIG. 2, the human-powered vehicle 10 further includes a first remote actuating device 52 for operating the front derailleur 42 and a second remote actuating device 54 for operating the rear derailleur 44. The first and second remote actuating devices 52 and 54 are preferably mounted on the handlebar 26. The first and second remote actuating devices 52 and 54 are user operated input devices. As seen in FIG. 2, the first remote actuating device 52 includes a first user operated part 52a and a second user operated part 52b, while the second remote actuating device 54 includes a first user operated part 54a and a second user operated part 54b. Here, the user operated parts 52a, 52b, 54a and 54b are push button switches that output control signals upon depressing the user operated parts 52a, 52b, 54a and 54b. However, the actuating devices 52 and 54 are not limited to the illustrated embodiment. Rather, for example, the actuating devices 52 and 54 can be in a form of shifter lever, a toggle switch, a dial, a single button operated device and the like.

Figure 3:
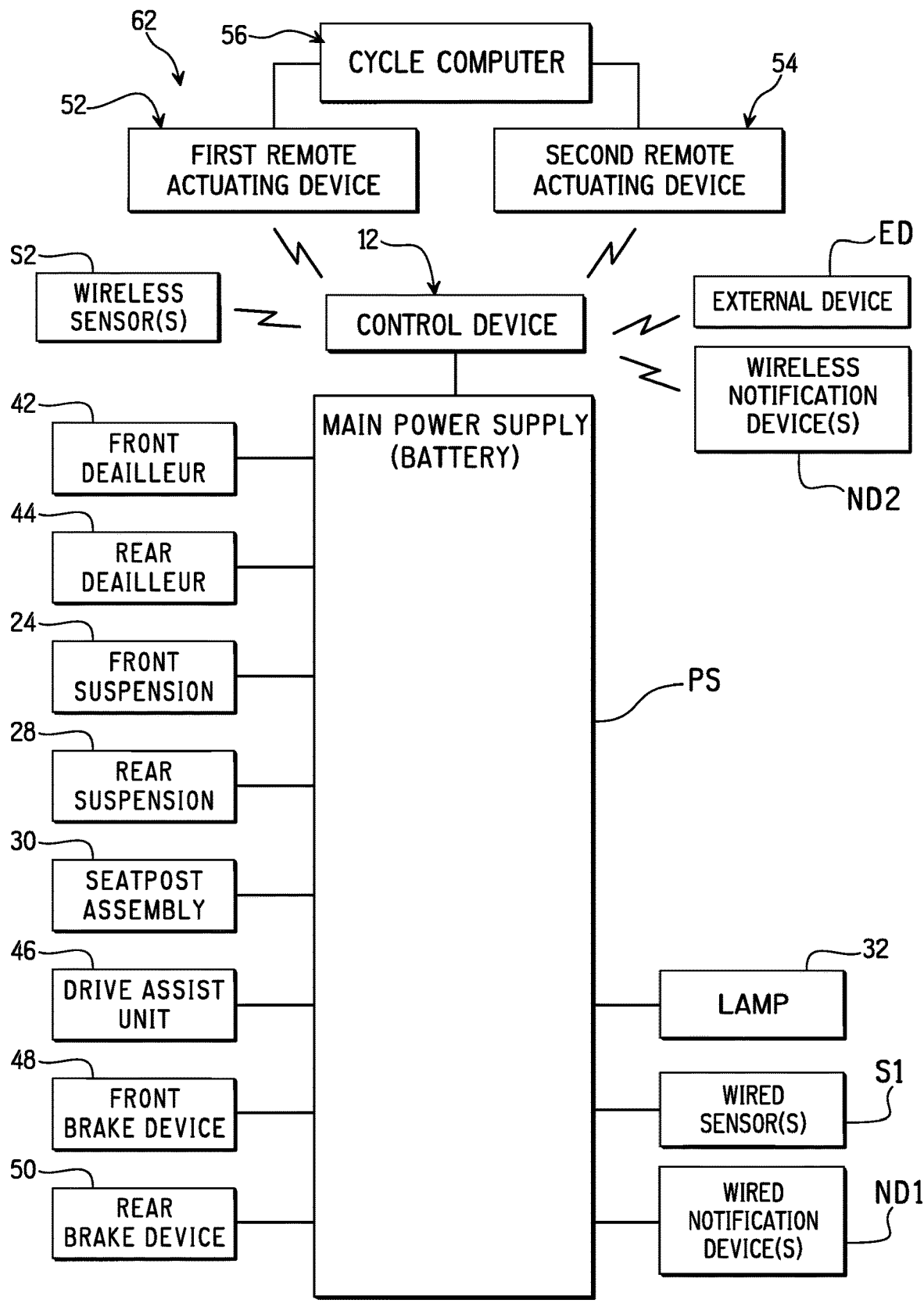
FIG. 3 is an overall block diagram showing one example of the control system for the human-powered vehicle illustrated in FIGS. 1 and 2.

Referring now to FIGS. 3 and 4, the first and second remote actuating devices 52 and 54 are configured to wirelessly communicate with one or more of the components 24, 28, 30, 32, 42, 44, 46, 48, 50 and 56. Preferably, the first remote actuating device 52 is configured to wirelessly communicate with the front derailleur 42 via the control device 12, while the second remote actuating device 54 is configured to wirelessly communicates with the rear derailleur 44 via the control device 12. Normally, one of the first and second user operated parts 52a and 52b is operated to perform a downshifting operation of the front derailleur 42, while the other one of the first and second user operated parts 52a and 52b is operated to perform an upshifting operation of the front derailleur 42. Similarly, normally, one of the first and second user operated parts 54a and 54b is operated to perform a downshifting operation of the rear derailleur 44, while the other one of the first and second user operated parts 54a and 54b is operated to perform an upshifting operation of the rear derailleur 44.

Referring to FIG. 4, the illustrated embodiment, the first remote actuating device 52 includes a power supply 52c, a wireless transceiver 52d and an antenna 52e. The power supply 52c can be a rechargeable or disposable battery. Alternatively, the power supply 52c can be a capacitor or other electrical storage device. The wireless transceiver 52d is a two-way wireless communication device capable of transmitting and/or receiving wireless communication signals. Alternatively, the wireless transceiver 52d is a one-way wireless communication device such as a wireless transmitter capable of only transmitting wireless communication signals. The antenna 52e is a conventional antenna that is configured to receive wireless communication signals.

Still referring to FIG. 4, the illustrated embodiment, the second remote actuating device 54 includes a power supply 54c, a wireless transceiver 54d and an antenna 54e. The power supply 54c can be a rechargeable or disposable battery. Alternatively, the power supply 54c can be a capacitor or other conventional electrical storage device, or can be a conventional energy generating device (generator). However, the power supply 54c is not limited to conventional electrical storage devices, or conventional energy generating devices. Thus, the power supply 54c does not need to be conventional. The wireless transceiver 54d is a two-way wireless communication device capable of transmitting and/or receiving wireless communication signals. Alternatively, the wireless transceiver 54d is a one-way wireless communication device such as a wireless transmitter capable of only transmitting wireless communication signals. The antenna 54e is a conventional antenna that is configured to receive wireless communication signals.

The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals used in the human-powered vehicle 10 can be radio frequency (RF) signals, ultra-wide band communication signals, or Bluetooth® communications or any other type of signal suitable for wireless communications as understood in the bicycle field.

Referring to FIGS. 2 to 4, the human-powered vehicle 10 further includes a cycle computer 56. The cycle computer 56 is configured to display current operation conditions of the human-powered vehicle 10 such as the current traveling speed, the current pedaling force, the current gear positions of the front and rear derailleurs 42 and 44, the height of the seatpost assembly 30, and the stiffness of each of the front suspension 24 and the rear suspension 28. Of course, the cycle computer 56 can be configured to display other operation conditions of the human-powered vehicle 10. In the first embodiment, the cycle computer 56 is mainly a display device for the user rather than a control device. As explained later, the control device 12 is primarily used to set various modes of operation However, the cycle computer 56 can be configured to change the mode of operation of the first and second remote actuating devices 52 and 54. In either case, the first and second remote actuating devices 52 and 54 can temporarily be changed to actuate, adjust or control one or more of the other ones of the components 24, 28, 30, 32, 46, 48, 50 and 56. Alternatively, one or more additional actuating devices can be provided to actuate, adjust or control the other ones of the components 24, 28, 30, 32, 46, 48, 50 and 56. In other words, one or more of the components 24, 28, 30, 32, 46, 48, 50 and 56 can be provided with its own dedicated user actuating device.

As diagrammatically illustrated in FIG. 4, the cycle computer 56 includes a processor 56a, memory 56b, a display 56c, a power supply 56d, a wireless transceiver 56e and an antenna 56f. The term "processor" as used herein refers to hardware that executes a software program and does not include a human. The processor 56a is an arithmetic processor that runs predetermined control programs stored in the memory 56b. The processor 56a can be a central processing unit (CPU) or a micro processing unit (MPU). The processor 56a is formed of one or more semiconductor chips that are mounted on a circuit board that includes the memory 56b. The memory 56b is any computer storage device or any non-transitory computer-readable medium with the sole exception of a transitory, propagating signal.

For example, the memory 56b can include nonvolatile memory and volatile memory, and can includes a ROM (Read Only Memory) device, a RAM (Random Access Memory) device, a hard disk, a flash drive, etc. The display 56c is preferably a touch screen display such that the user can change the operating modes of the first and second remote actuating devices 52 and 54 as mentioned below. Alternatively, the cycle computer 56 can use a non-touch screen display and have user inputs such as press-type buttons. The display 56c is controlled by the processor 56a. The power supply 56d can be a rechargeable or disposable battery. Alternatively, the power supply 56d can be a capacitor or other electrical storage device. The wireless transceiver 56e is a two-way wireless communication device capable of transmitting and/or receiving wireless communication signals. The antenna 56f is a conventional antenna that is configured to receive wireless communication signals.

As seen in FIG. 2, the cycle computer 56 is connected to the first remote actuating device 52 by a first electrical wire 58. The cycle computer 56 is connected to the second remote actuating device 54 by a second electrical wire 60. Since the cycle computer 56 is connected to the first and second remote actuating devices 52 and 54 by the electrical wires 58 and 60, the first and second remote actuating devices 52 and 54 and the cycle computer 56 can be configured to use a common wireless communication device if needed and/or desired. While the cycle computer 56 is illustrated as connected to the first and second remote actuating devices 52 and 54 by the electrical wires 58 and 60, the cycle computer 56 could be configured to wirelessly communicate with the first and second remote actuating devices 52 and 54.

In the first embodiment, preferably, the control device 12 is primarily used to change the mode of operation of the first and second remote actuating devices 52 and 54. Preferably, the default mode of the first and second remote actuating devices 52 and 54 is a shift operating mode in which the first remote actuating device 52 controls the shifting operation of the front derailleur 42 and the second remote actuating device 54 controls the shifting operation of the rear derailleur 44. In the shift operating mode (the default mode), the user can change the gear ratio of the drivetrain 22 by a user input to one of the user operated parts 52a, 52b, 54a and 54b of the first and second remote actuating devices 52 and 54.

As seen in FIG. 3, a control system 62 comprises the control device 12. The control system 62 further comprises at least one of the components 24, 28, 30, 32, 42, 44, 46, 48, 50 and 56 of the human-powered vehicle 10. The control system 62 further comprises the first and second remote actuating devices 52 and 54 and the cycle computer 56. The control system 62 further comprises a power supply unit PS that is electrically connected to the control device 12. The power supply unit PS is also electrically connected to the at least one of the components 24, 28, 30, 32, 42, 44, 46, 48, 50 and 56 of the human-powered vehicle 10. Here in the illustrated embodiment, the control system 62 includes each of the components 24, 28, 30, 32, 42, 44, 46, 48, 50 and 56 of the human-powered vehicle 10 and the power supply unit PS is electrically connected to each of the components 24, 28, 30, 32, 42, 44, 46, 48, 50 and 56 of the human-powered vehicle 10.

Referring now to FIGS. 4 to 7, the control device 12 will now be discussed in further detail. The control device 12 is provided to the front frame body 14 (e.g., top tube). However, the control device 12 is not limited to being provided to the front frame body 14. As seen in FIG. 4, the control device 12 basically comprises a controller 70. The controller 70 is preferably a microcomputer that includes at least one processor 70a and memory 70b. The controller 70 is formed of one or more semiconductor chips that are mounted on a circuit board. Thus, the controller 70 is an electronic controller. The terms "controller" and "electronic controller" as used herein refer to hardware that executes a software program and does not include a human. The memory 70b is any computer storage device or any non-transitory computer-readable medium with the sole exception of a transitory, propagating signal. For example, the memory 70b can include nonvolatile memory and volatile memory, and can includes a ROM (Read Only Memory) device, a RAM (Random Access Memory) device, a hard disk, a flash drive, etc.

The controller 70 is configured to activate (e.g., control, actuate or adjust) the components 24, 28, 30, 32, 42, 44, 46, 48, 50 and 56 in response to inputs from either the first and second remote actuating devices 52 and 54 or other sensors that indicate a particular operating condition as explained below. Moreover, the controller 70 can control one or more of the components 24, 28, 30, 32, 42, 44, 46, 48, 50 and 56 of the human-powered vehicle 10 without operating the first and second remote actuating devices 52 and 54. In other words, the controller 70 is configured to be connected to at least one of the components 24, 28, 30, 32, 42, 44, 46, 48, 50 and 56 of the human-powered vehicle 10 such that the controller 70 is free from executing normal activation of the at least one of the components 24, 28, 30, 32, 42, 44, 46, 48, 50 and 56 in accordance to a first input in a first mode. The controller 70 is further configured to operate at least one of an actuator and an indicator in accordance to the first input in a second mode. Here, the components 24, 28, 30, 32, 42, 44, 46, 48 and 50 are each provided with an actuator.

In the control system 62, the at least one component includes one of the lamp 32 and the display device 56c. Also, here, the indicator is provided to one of the lamp 32 and the display device 56c. In other words, in the second mode, one or both of the lamp 32 and the display device 56c can provide a user with a notification in accordance to the first input while the controller 70 is in the second mode. Also, the one or both of the lamp 32 and the display device 56c can be used to notify the user of the controller 70 switching from the first mode to the second mode as explained below. Also, as explained below, it will be apparent from this disclosure that any indicating device can be used to indicate that the switching mode has occurred.

The first input can be any user performed input that is received by the controller 70 but does not include a user performed input that is received by the controller 70 based on the operation of one of the first and second remote actuating devices 52 and 54. The term "normal activation" as used herein refers to activation of one or more of the components 24, 28, 30, 32, 42, 44, 46, 48, 50 and 56 using a user input device that is set as a regular way to activate the component during riding. In other words, in the illustrated embodiment, the term "normal activation" as used herein refers to activation of one or more of the components 24, 28, 30, 32, 42, 44, 46, 48, 50 and 56 by using one of the first and second remote actuating devices 52 and 54. Generally, as mentioned above, an actuator (e.g., the actuators 24a, 28a, 30a 42b and 44b) is provided to one of the transmission (e.g., the front derailleur 42 and the rear derailleur 44), the suspension 24 or 28, the seatpost assembly 30, the brake device 48 or 50, and the drive assist unit 46. In the second mode, one of the actuator (e.g., the actuators 24a, 28a, 30a 42b and 44b) is operated based on the second input (either a user input or a predetermined condition).

The control system 62 further includes one or more wired notification devices ND1 and one or more wireless notification devices ND2. The notification devices ND1 and ND2 are indicators which includes, but not limited to, visual indicators such as lights, audible indicators such as buzzers, and haptic indicators such as a vibration inducing device. Here, one of the wired notification devices ND1 is provided on the lamp 32, for example, as a light that blinks when the controller 70 switches from the first mode to the second mode based on detection of a predetermined condition of the human powered vehicle 10. Also, here, one of the wireless notification devices ND2 is an icon that is provided on the display 56c of the cycle computer 56, which for example, flashes when the controller 70 switches from the first mode to the second mode based on detection of a predetermined condition of the human powered vehicle 10 or a user input that constitutes the second input. The wireless notification devices ND2 can also include a smartphone, tablet, and the like that can notify the user of a particular event. Also, the controller 70 can active several different wired and/or wireless notification devices at the same time so that the user can be notified of the particular event such as switching from the first mode to the second mode.

Generally, as mentioned above, the controller 70 of the control device 12 has the first mode, which is a user input mode, and the second mode, which is an automatic setting mode that also allows for manual operation of the components 24, 28, 30, 32, 42, 44, 46, 48, 50 and 56 by the user. In the first mode (user input mode), the controller 70 operates based on user inputs other than using the first and second remote actuating devices 52 and 54. In the second mode, the controller 70 automatically operates one or more of the components 24, 28, 30, 32, 42, 44, 46, 48, 50 and 56 without either one of the first remote actuating device 52 and the second remote actuating device 54 being operated.

For example, for the transmission (the front and rear derailleurs 42 and 44) in the first mode, the control device 12 can be used by the user to perform various setting such as a shift setting mode, a Bluetooth LE connection mode, an drive assist mode, a rear derailleur protection reset mode, a user input switching mode for switching from the first mode to the second mode, etc. For the front and rear suspensions 24 and 28 in the first mode, for example, the control device 12 can be used by the user to perform various setting of one or both of the front and rear suspensions 24 and 28 to set a desired stiffness by controlling the actuators 24a and/or 28a. For the seatpost assembly 30 in the first mode, for example, the control device 12 can be used by the user to perform various setting of the seatpost assembly 30 to set a desired height by controlling the actuator 30a. For the drive assist unit 46 in the first mode, for example, the control device 12 can be used by the user to perform various setting of the drive assist unit 46 to set a desired drive assist amount by controlling an actuator (not shown) of the drive assist unit 46. For the front and rear brake devices 48 and 50 in the first mode, for example, the control device 12 can be used by the user to perform various setting of one or both of the front and rear brake devices 48 and 50 to set a desired braking performance by controlling actuators (not shown) in the front and rear brake devices 48 and 50.

As previously mentioned, the controller 70 switches to the second mode in response to the second input (either a user input or a predetermined condition). When the controller 70 switches to the second mode, the controller 70 automatically sets one or more of the components 24, 28, 30, 32, 42, 44, 46, 48, 50 and 56 to a predetermined setting, which can be preset and prestored by the user using the external device ED. For example, the front and rear suspensions 24 and 28 are automatically set to a predetermined stiffness by the controller 70, the seatpost ASP is automatically set to a predetermined height by the controller 70, the lamp 32 is automatically set to a desired output by the controller 70, the front and rear derailleurs 42 and 44 are automatically set to be operated on a predetermined parameter by the controller 70, the drive assist unit 46 is automatically set to a desired drive assist (e.g., Normal setting) by the controller 70, the front and rear brake devices 48 and 50 are automatically set to a predetermined braking responsiveness by the controller 70, and the display device 56c of the cycle computer 56 is automatically set to a desired screen display by the controller 70. For example, in the second mode, the controller 70 operates at least one of an actuator of a component (e.g., at least one of the components 24, 28, 30, 32, 42, 44, 46, 48 and 50) in accordance to the first input. In addition, in the second mode, the controller 70 of the control device 12 preferably operates the lamp 32 and/or the display device 56c automatically to notify the user of a particular event such as switch from the first mode to the second mode. Furthermore, in the second mode, the controller 70 operates an indicator that is provided to one of the lamp 32 and/or the display device 56c in accordance to the first input by the user.

Figure 11:
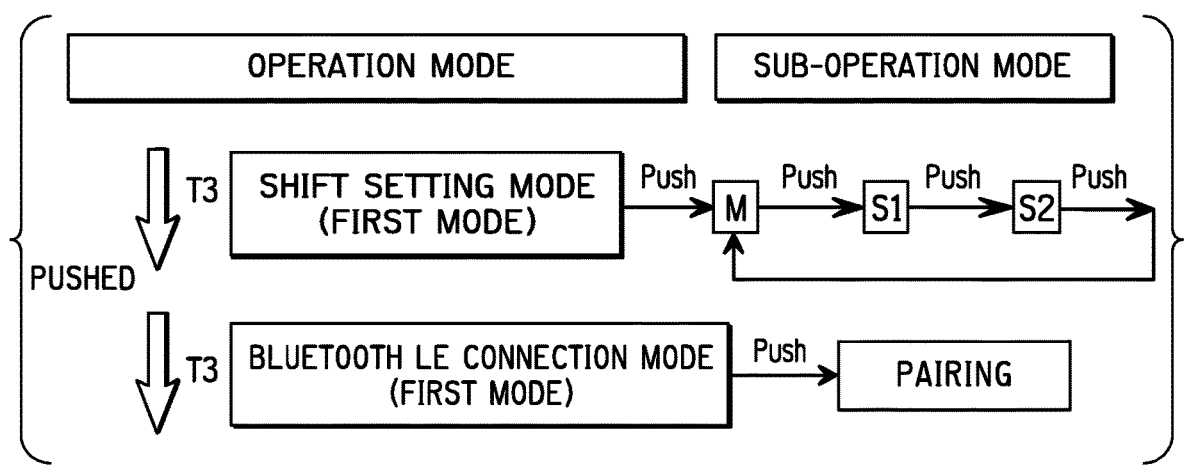
FIG. 11 is a schematic diagram of operations performed by the control device illustrated in FIGS. 1 to 6 in which the user input device is operated in the opposite direction for a third operating duration as shown in FIG. 10 to switch between different ones of the first modes.
Figure 12:
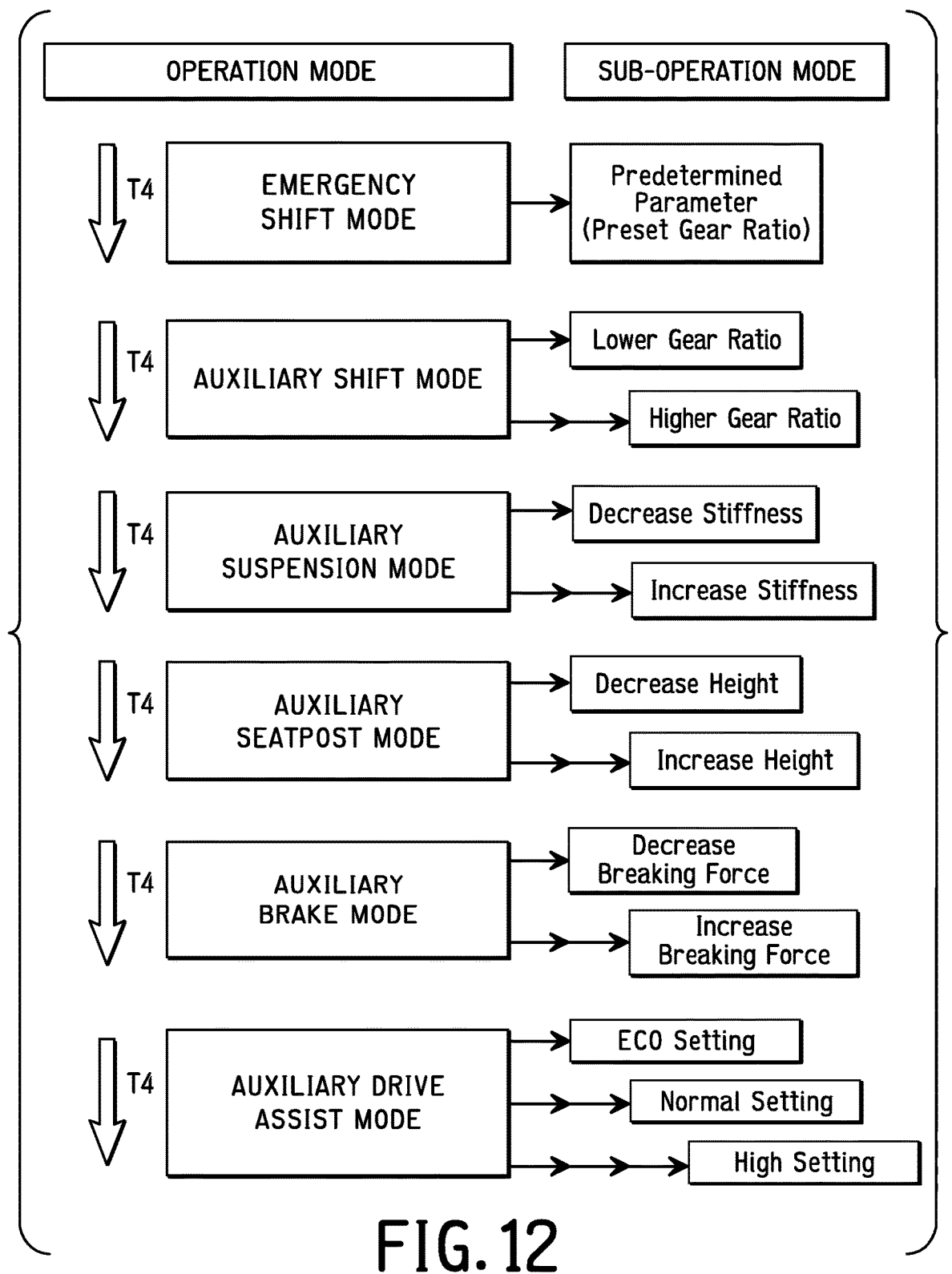
FIG. 12 is a schematic diagram of operations performed by the control device illustrated in FIGS. 1 to 6 in which the user input device is operated in the opposite direction for a fourth operating duration as shown in FIG. 10 to switch between different ones of the second modes.

In the illustrated embodiment, as seen in FIG. 11, the first mode of the controller 70 includes, but not limited to for example, the shift setting mode (switching between user shifting and automatic shifting), the Bluetooth LE connection mode (pairing the control device 12 with a wireless external device ED). Of course, the first mode of the controller 70 preferably includes other modes such as a drive assist mode, a rear derailleur protection reset mode, and the like. As seen in FIG. 12, the second mode of the controller 70 includes, but not limited to for example, an emergency shift mode (the front and rear derailleurs 42 and 44 being operated based on a predetermined parameter), an auxiliary shift mode (user shifting of one or both of the front and rear derailleurs 42 and 44), an auxiliary suspension mode (user adjustment of one or both of the front and rear suspensions 24 and 28), an auxiliary seatpost mode, an auxiliary brake mode (user adjustment of one or both of the front and rear brake devices 48 and 50) and an auxiliary drive assist mode (user adjustment of an assist mode such as Eco, Normal or High).

Also, in the illustrated embodiment, the shift setting mode is set as the default first mode of the controller 70 and the emergency shift mode is set as the default second mode of the controller 70 when the control system 62 is started up. Of course, any one of the first modes of the controller 70 can be set as the default first mode either by the manufacturer or a user. Likewise, any one of the second modes of the controller 70 can be set as the default second mode, such as the auxiliary shift mode, either by the manufacturer or a user. In the emergency shift mode, as mentioned above, the front and rear derailleurs 42 and 44 are operated based on a predetermined parameter. For example, the predetermined parameter can be a preset gear ratio where the front shift stage is a neutral or middle stage and the rear shift stage is the fourth stage. The preset gear ratio can be set by the manufacturer or a user as needed and/or desired. For example, several preset gear ratios can be stored in the memory 70b such that the user can select one of the preset gear ratios as the default gear ratio to be used by the controller 70 in the emergency shift mode. The user set the default gear ratio while in the first mode or while in the second mode.

However, the predetermined parameter is not limited to preset of gear ratios as shown in the exemplary embodiment. The predetermined parameter could include one or more of conditions of the bicycle, for example, a detected pedal force, a detected traveling velocity, a detected vehicle acceleration, a detected vehicle inclination, a detected tire pressure, etc. In this way, the controller 70 automatically selects an appropriate gear ratio of the front and rear derailleurs 42 and 44 for the current riding conditions based on the predetermined parameter that was detected. Preferably, the predetermined parameter can be selected by the user while in the emergency shift mode to better optimize the gear ratio selection by the controller 70.

In the auxiliary shift mode, the user can manually input a shift command to a lower gear ratio or a higher gear ratio from either a current gear ratio or one automatically selected by the controller 70 based on the predetermined parameter. Also, in the auxiliary shift mode, the user input can result in a forced synchro-shift as needed and/or desired. The auxiliary shift mode can also be considered as another type of emergency mode for the user to operate at least one of the components 24, 28, 30, 32, 42, 44, 46, 48 and 50 when the first and second remote actuating devices 52 and 54 are disconnected or otherwise not properly working.

Figure 6:
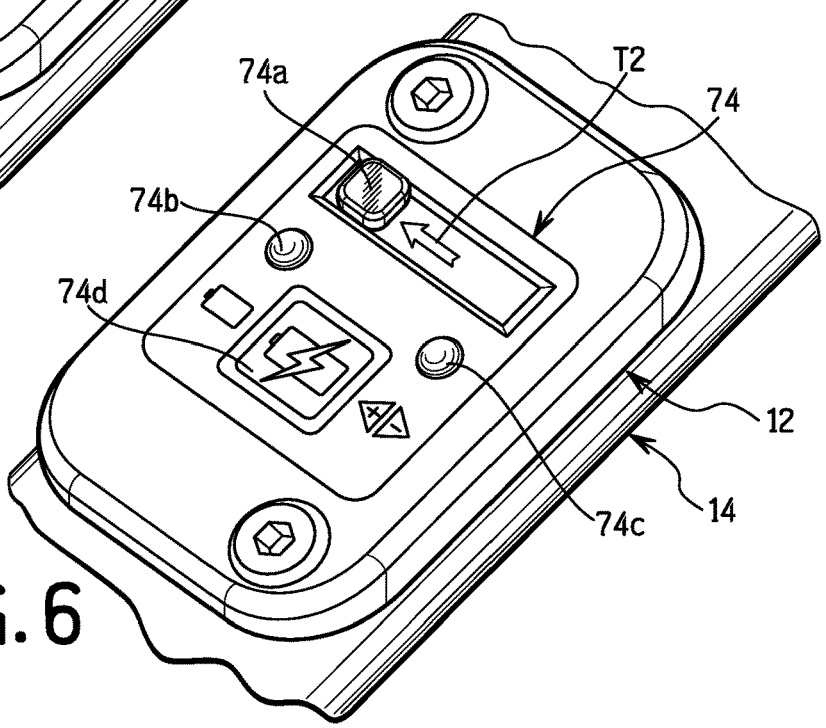
FIG. 6 is a perspective view, similar to FIG. 5, of the portion of the front frame body that includes the control device of the control system in which the user input device of the control device has been moved to a first operated position for performing a first input based on a first operating duration that the user input device is operated and a second input based on a second operating duration that the user input device is operated.
Figure 7:
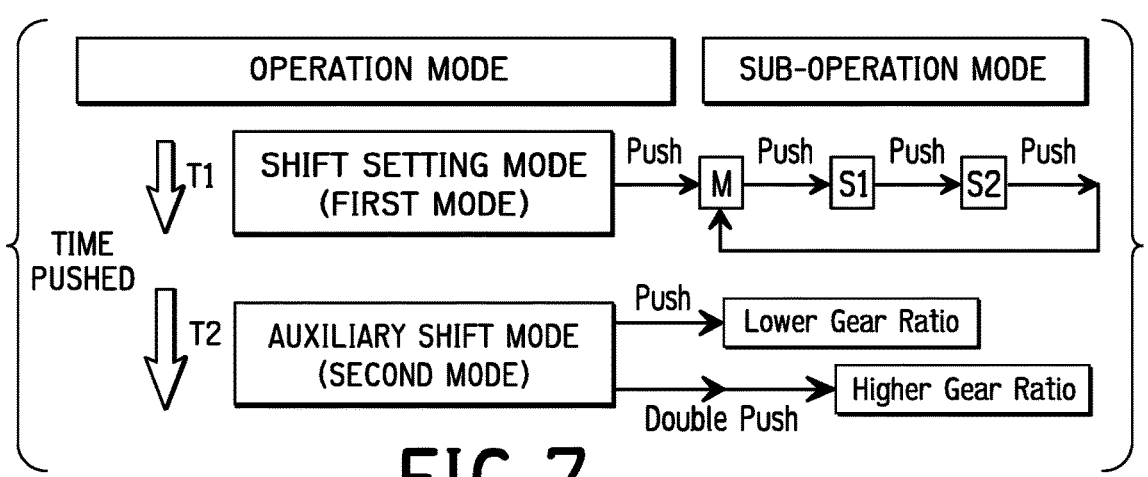
FIG. 7 is a schematic diagram of operations performed by the control device illustrated in FIGS. 1 to 6 in which the first and second inputs are performed based on the first and second operating durations that the user input device is operated.
Figure 8:
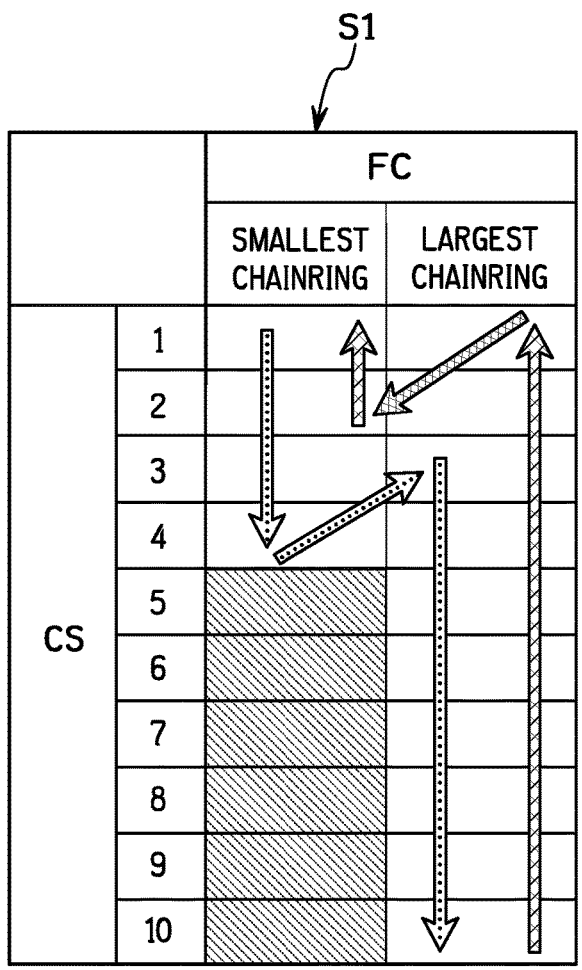
FIG. 8 is a first synchro-shift table executed by a controller of the control device illustrated in FIGS. 1 to 6 for a drivetrain having two front chainwheels and ten rear sprockets as illustrated in FIG. 1.

In the illustrated embodiment, as seen in FIG. 7, when the controller 70 is set to any one of the first and second modes, the first input is used to carry out the function of that mode. The first mode is switched into the second mode in accordance to a second input that is different from the first input. The second input can be a user performed input or a sensor created input, but in any case, the second input is distinguishable from the first input by the controller 70. FIG. 6 illustrates one example of the first and second inputs that are performed by the user as explained below.

The control system 62 further comprises an additional control device configured to operate at least one of the components 24, 28, 30, 32, 42, 44, 46, 48, 50 and 56 in accordance to a user input while in the first mode. The user input is different from the first and second inputs. In the illustrated embodiment, the first and second remote actuating devices 52 and 54 constitute additional control devices that are configured to operate the components 24, 28, 30, 32, 42, 44, 46, 48, 50 and 56 in accordance to a user input while the controller 70 is in the first mode. Thus, in the first mode, the controller 70 is configured to activate (e.g., control, actuate or adjust) one or more of the components 24, 28, 30, 32, 42, 44, 46, 48, 50 and 56 in response to user inputs from the first and second remote actuating devices 52 and 54.

Here, in the control system 62, the control device 12 is a junction that is electrically connected to the power supply unit PS by an electrical wire (a power line), and each of the components 24, 28, 30, 32, 42, 44, 46, 48 and 50 is electrically connected to the power supply unit PS by a plurality of electrical wires (power lines) as diagrammatically shown in FIG. 4. However, the control device 12 is not limited to the illustrated embodiment (junction). Rather, the control device 12 can be an additional switch, a satellite switch, an activation button or the likes. Moreover, the control system 62 is not limited to the illustrated wiring arrangement. For example, some or all of the components 24, 28, 30, 32, 42, 44, 46, 48 and 50 can be directly connected to the control device 12. Also, for example, the control device 12 can be indirectly connected to the power supply unit PS via one or more of the components 24, 28, 30, 32, 42, 44, 46, 48 and 50. In any case, the power supply unit PS is electrically connected to the controller 70 of the control device 12.

Each of the components 24, 28, 30, 32, 42, 44, 46, 48 and 50 can have a power line communication (PLC) interface for communicating via power lines using power line communications (PLC). Alternatively, one or more of the components 24, 28, 30, 32, 42, 44, 46, 48 and 50 can be connected to the controller 70 of the control device 12 by one or more dedicated signal wires (directly or indirectly). Since the components 24, 28, 30, 32, 42, 44, 46, 48 and 50 are electrically connected to the controller 70 and communicate via wires, the controller 70 can still operate the components 24, 28, 30, 32, 42, 44, 46, 48 and 50 in the event that the first and second remote actuating devices 52 and 54 become disconnected for some reason (e.g., signal interference, low battery level, wire disconnection etc.).

In the illustrated embodiment, the power supply unit PS is electrically connected to the controller 70 of the control device 12 and the components 24, 28, 30, 32, 42, 44, 46, 48 and 50 by wires. Alternatively, one or more of the control device 12 and the components 24, 28, 30, 32, 42, 44, 46, 48 and 50 can have its own built-in dedicated power supply. Alternatively, some of the components 24, 28, 30, 32, 42, 44, 46, 48 and 50 can share a power supply unit and some of the components 24, 28, 30, 32, 42, 44, 46, 48 and 50 can have a built-in dedicated power supply.

The control system 62 further comprises a wireless communication unit 72 that is electrically connected to the controller 70 of the control device 12. In the illustrated embodiment, the wireless communication unit 72 is provided in the housing of the control device 12 that also houses the controller 70. Alternatively, the wireless communication unit 72 is provided in one or more of the components 24, 28, 30, 32, 42, 44, 46, 48 and 50. Alternatively, the wireless communication unit 72 is provided as a separate self-contained unit that is connected to the power lines of the control system 62 to communicate with the control device 12 and the components 24, 28, 30, 32, 42, 44, 46, 48 and 50 using power line communications or connected by one or more dedicated signal wires (directly or indirectly). The wireless communication unit 72 can also communicate with the external device ED. The external device ED can be used to change a manufacturer's default setting of one or more of the components 24, 28, 30, 32, 42, 44, 46, 48, 50 and 56 to a user preferred setting or another prestored setting.

The control device 12 further comprises a user interface 74. The user interface 74 is used by the user to perform the first input. Also, the controller 70 is configured to switch from the first mode into the second mode in accordance to the second input applied to the user interface 74. Also, the controller 70 is configured to switch from the first mode to the second mode upon detecting a predetermined condition of the human powered vehicle 10. Here, as illustrated in FIGS. 3 and 4, the control system 62 further includes wired sensors S1 and wireless sensors S2 for detecting predetermined conditions of the human powered vehicle 10. Examples of sensors S1 and S2 include a pedaling force sensor, a pedaling cadence sensor, an acceleration sensor, a velocity sensor, an inclination sensor, a tire pressure sensor, etc. Also, the predetermined parameter that includes one or more condition of the bicycle used in the emergency shift mode is detected by using one or more of the sensors S1 and S2.

In the first embodiment, the predetermined condition for switching from the first mode to the second mode is an emergency state in the first and second remote actuating devices 52 and 54 can no longer be used to control the components 24, 28, 30, 32, 42, 44, 46, 48, 50 and 56 (i.e., a disconnection condition). However, the predetermined condition is not limited to just detecting the disconnection condition of the first and second remote actuating devices 52 and 54. For example, the predetermined condition for switching from the first mode to the second mode can include detecting pedaling force, pedaling cadence, vehicle acceleration, vehicle traveling velocity, vehicle inclination, or the likes as additional parameters to determine if the predetermined condition exists. In other words, the controller 70 may detect the first and second remote actuating devices 52 and 54 have become disconnected while riding, and in the same time the parameters of acceleration, velocity, etc. will be analyzed to determine if the human-powered vehicle 10 is really in the predetermined condition (the emergency state). The order of detecting the disconnection condition and the additional parameters is not limited to being detected at the same time, but rather can be the disconnection condition can be detected first and then the additional parameters, or the additional parameters first detecting then the disconnection condition.

The wired sensors S1 and wireless sensors S2 send detection signals to the controller 70 for controlling the components 24, 28, 30, 32, 42, 44, 46, 48, 50 and 56 based on the detection signals when the controller 70 is in the second mode. The wired sensors S1 and wireless sensors S2 send detection signals to the controller 70 for controlling the components 24, 28, 30, 32, 42, 44, 46, 48, 50 and 56 based on the detection signals when the controller 70 is set to an automatic mode for controlling the components 24, 28, 30, 32, 42, 44, 46, 48, 50 and 56 without any user input. The controller 70 also detects disconnection (e.g., signal interference, low battery level, wire disconnection etc.) of the first and second remote actuating devices 52 and 54 from the wireless communication unit 72 as a predetermined condition for switching from the first mode to the second mode. However, as mentioned above, the predetermined condition is not limited to the disconnection condition but can include additional parameters (acceleration, velocity, etc.) for determining if a predetermined condition exists for switching from the first mode to the second mode. In other words, the controller 70 of the control device 12 is configured to switch from the first mode to the second mode upon detecting disconnection between the additional control device (e.g., the first and second remote actuating devices 52 and 54) and the at least one component (at least one of the components 24, 28, 30, 32, 42, 44, 46, 48, 50 and 56) and/or additional parameters exist indicative of the predetermined condition existing. As mentioned above, while the wireless communication unit 72 is part of the controller 70, each of the components 24, 28, 30, 32, 42, 44, 46, 48, 50 and 56 can include its own wireless communication unit or can share a wireless communication unit that is part of one the components 24, 28, 30, 32, 42, 44, 46, 48, 50 and 56. Also, as mentioned above, the wireless communication unit 72 can be a separate and independent component that is separately and independently mountable to the human-powered vehicle 10.

Figure 5:
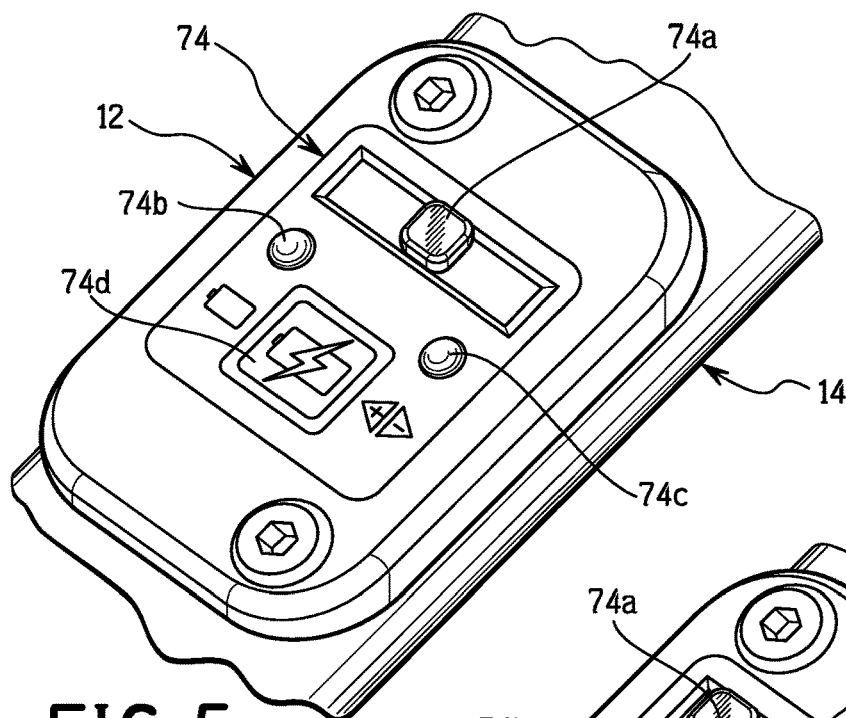
FIG. 5 is a perspective view of a portion of the front frame body that includes the control device of the control system in which a user input device of the control device is disposed in an unoperated or rest position.

In the illustrated embodiment, the user interface 74 includes a user operated input 74a for receiving user inputs. Preferably, the user operated input 74a is either a push switch or a slide switch. In either case, the user pushes on the user operated input 74a to output a signal and releases the user operated input 74a to stop outputting the signal. Here, the user operated input 74a is a slide switch that is biased to a center position as seen in FIG. 5. Thus, the center position of the user operated input 74a corresponds to an unoperated or rest position. The user interface 74 is not limited to the slide switch illustrated in the FIGS. 2, 5 and 6, and can include, for example, a button, a lever, a dial and/or a touch screen. The user interface 74 can communicate various commands (e.g. the first and second inputs) to the controller 70 based on the way in which the user interface 74 is operated. For example, also, the user interface 74 can be a portable device.

Here, the user interface 74 also includes a first LED indicator 74*b*, a second LED indicator 74*c* and a charging port 74*d*. The first and second LED indicators 74*b* and 74*c* are preferably different colors. The first and second LED indicators 74*b* and 74*c* are selectively activated based on the user input of the user operated input 74*a*. Also, one or both of the first and second LED indicators 74*b* and 74*c* is activated when the controller 70 switches from the first mode to the second mode based on a predetermined switching condition existing or based on the second input being a user input. Of course, it will be apparent from this disclosure that any indicating device can be used to indicate that the switching mode has occurred. For example, the lamp 32 can be caused to blink when the controller 70 switches from the first mode to the second mode. Also, for example, the display 56*c* of the cycle computer 56 can have an icon as an indicator that flashes when the controller 70 switches from the first mode to the second mode.

As for the user inputs corresponding to the first input and the second input, three examples will be explained using the user operated input 74*a*. Namely, the user operated input 74*a* can be operates based on: (1) an operating duration (e.g., a long press or a short press) of the user input; (2) an operating amount (e.g., a long movement or a short movement) of the user input; and (3) an operating direction (e.g. left, right, up, down or the like with different direction) of the user input. The user inputs corresponding to the first input and the second input do not need to be related. In other words, for example, the first input could be based on an operating duration of the user operated input 74*a*, while the second input could be based on an operating amount of the user operated input 74*a*. Moreover, the user inputs can be different for switch between the different types of the first mode and the different types of the second modes. Likewise, the user inputs can be different for each operation within a particular one of the first mode and for each operation within a particular one of the second modes.

Thus, with the controller 70 in the first mode, the user can operate the user operated input 74*a* to carry out a plurality of setting operations of the of the components 24, 28, 30, 32, 42, 44, 46, 48, 50 and 56. On the other hand, with the controller 70 in the second mode, each of the components 24, 28, 30, 32, 42, 44, 46, 48, 50 and 56 can be individually operated by the user using the user interface 74 to manually adjust each of the components 24, 28, 30, 32, 42, 44, 46, 48, 50 and 56.

In one case as seen in FIGS. 5 to 7, the first input is applied to the user interface 74 with a first operating duration T1, and the second input is applied to the user interface 74 with a second operating duration T2 that is different from the first operating duration T1. For example, the user operated input 74*a* is pushed from the center rest position shown in FIG. 5 to the left as shown in FIG. 6 to send a signal to the controller 70 that is indicative of either the first input or the second input. Based on the operating duration of the user operated input 74*a* being pushed, the controller 70 determines whether the first input or the second input was inputted by the user.

Figure 9:
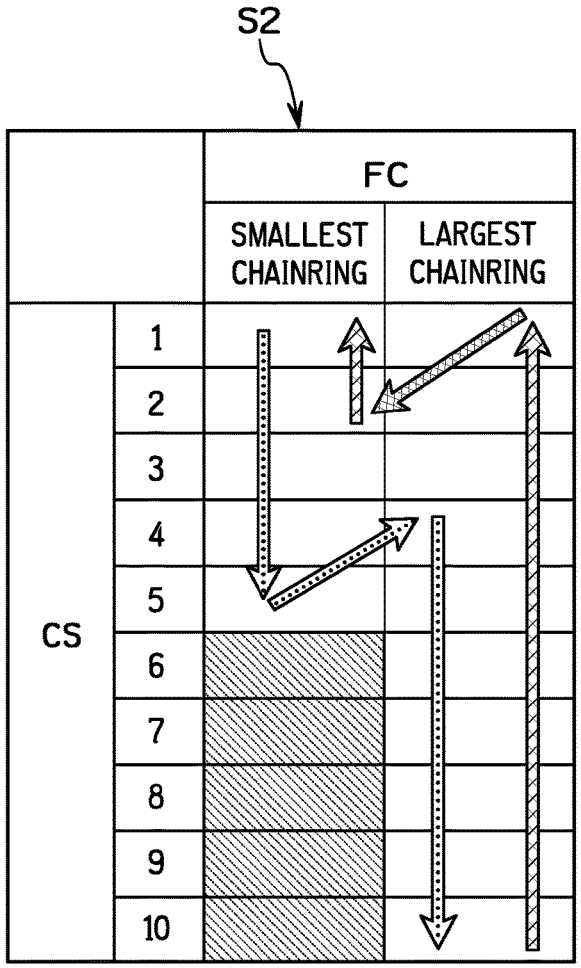
FIG. 9 is a second synchro-shift table executed by the controller of the control device illustrated in FIGS. 1 to 6 for the drivetrain illustrated in FIG. 1.

For example, as illustrated in FIG. 7, the controller 70 has a default first mode of the shift setting mode (i.e., the first mode) in which the user operated input 74*a* is pushed to the left for less than 0.5 second (i.e., the first operating duration T1) to perform the first input while in the first mode. The initial operation of the user operated input 74*a* will activate the controller 70 if the controller 70 is in a low operating condition or switched off. Each subsequent one of the first inputs changes from one predefined setting to the next predefined setting while in the shift setting mode (i.e., the first mode). Here, in the shift setting mode (i.e., the first mode), the user can select a user shift setting M, the first synchro-shift setting (see synchro-shift table in FIG. 9) and a second synchro-shift setting (see synchro-shift table in FIG. 10) by pushing the user operated input 74*a* to the left for less than 0.5 second (i.e., the first operating duration T1). In this way, the controller 70 sets how the front derailleur 42 and the rear derailleur 44 will be operates in response to operation of the first remote actuating device 52 and/or the second remote actuating device 54. In the event that the first remote actuating device 52 and/or the second remote actuating device 54 become disconnected for some reason (e.g., signal interference, low battery level, wire disconnection etc.), the controller 70 switches to the second mode to automatically force the front derailleur 42 and the rear derailleur 44 to operate in accordance with the predetermined parameter under the emergency shift mode. In the emergency shift mode, as seen in FIG. 12, the user can select a first predetermined parameter, a second predetermined parameter, or a third predetermined parameter.

If the user operated input 74*a* is pushed to the left for more than 0.5 second (i.e., the second operating duration T2) while in the shift setting mode (i.e., the first mode), then the controller 70 detects the second input has been performed. Upon detecting the second input has been performed, the controller 70 switches from the first mode to the second mode. Here, the controller 70 has an auxiliary user shifting mode (i.e., the second mode) as the default second mode. The auxiliary shift mode (i.e., the second mode) allows the user to shift one or both of the front and rear derailleurs 42 and 44 by operating the user operated input 74*a*. The front derailleur 42 and/or the rear derailleur 44 is operated based on the shift setting set in the shift setting mode. The user shift setting M is the default setting. Now, if the user operated input 74*a* is pushed to the left for less than 0.5 second (i.e., the first operating duration T1) to perform the first input, then the controller 70 detects the first input has been perform while in the auxiliary user shifting mode (i.e., the second mode). Each subsequent one of the first inputs (i.e., inputs of the first operating duration T1) changes controls the actuator of the front derailleur 42 and/or the rear derailleur 44 based on the shift setting set in the shift setting mode. Here, in the auxiliary shift mode, the user decreases the gear ratio by pushing the user operated input 74*a* to the left for less than 0.5 second (i.e., the first operating duration T1) to perform the first input, and the user increases the gear ratio by twice pushing the user operated input 74*a* to the left for less than 0.5 second (i.e., the first operating duration T1) within 1.5 seconds.

Figure 10:
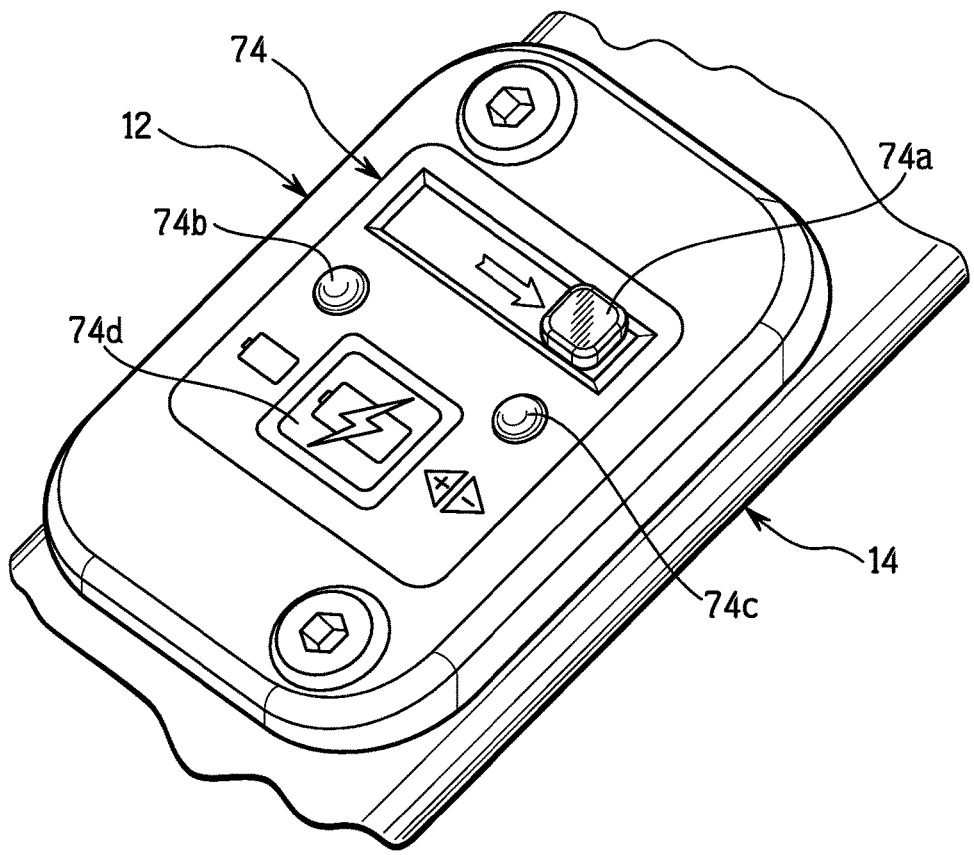
FIG. 10 is a perspective view, similar to FIGS. 5 and 6, of the portion of the front frame body that includes the control device of the control system in which the user input device of the control device has been moved to a second operated position to perform a third input.

Referring to FIGS. 10 to 12, now if the user wants to switch between different ones of the first modes or different ones of the second modes, then the user pushes the user operated input 74*a* in the opposite direction for either a third operating duration T3 to switch between the first modes or a fourth operating duration T4 to switch between the second modes. For each of the different ones of the first modes and each of the different ones of the second modes, the user pushes the user operated input 74*a* in the same manner as discussed above with respect to the shift setting mode or the auxiliary shift mode. The third operating duration T3 is different from the fourth operating duration T4. The third operating duration T3 can be equal to the first operating duration T1 or different. The fourth operating duration T4 can be equal to the second operating duration T2 or different.

In another case as seen in FIGS. 5 and 13 to 15, the controller 70 can bet set so that the first input is applied to the user interface 74 with a first operating amount A1, and the second input is applied to the user interface 74 with a second operating amount A2 that different from the first operating amount A1. For example, the user operated input 74a is pushed from the center rest position shown in FIG. 5 to the left by the first operating amount A1 and then released, a signal is sent to the controller 70 indicating the first input was inputted by the user. On the other hand, when the user operated input 74a is pushed from the center rest position shown in FIG. 5 to the right by a second operating amount A2 and then released, a signal is sent to the controller 70 indicating the second input was inputted by the user. In other words, the controller 70 is set to determine the first input was inputted by the user upon detecting the user operated input 74a being pushed by the first operating amount A1, and to determine the second input was inputted by the user upon detecting the user operated input 74a being pushed by the second operating amount A2. Thus, based on the operating amount of the user operated input 74a being pushed, the controller 70 determines whether the first input or the second input was inputted by the user.

For example, as illustrated in FIG. 15, the controller 70 has the default first mode of the shift setting mode (i.e., the first mode) in which the user operated input 74a is pushed to the left for the first operating amount A1 to perform the first input while in the first mode. The initial operation of the user operated input 74a will activate the controller 70 if the controller 70 is in a low operating condition or switched off. Each subsequent one of the first inputs changes from one predefined setting to the next predefined setting while in the shift setting mode (i.e., the first mode). Here, in the shift setting mode (i.e., the first mode), the user can select a user shift setting M, a first synchro-shift setting (see synchro-shift table in FIG. 9) and a second synchro-shift setting (see synchro-shift table in FIG. 10) by pushing the user operated input 74a to the left for the first operating amount A1 to perform the first input. In this way, the controller 70 sets how the front derailleur 42 and the rear derailleur 44 will be operates in response to operation of the first remote actuating device 52 and/or the second remote actuating device 54. In the event that the first remote actuating device 52 and/or the second remote actuating device 54 become disconnected for some reason (e.g., signal interference, low battery level, wire disconnection etc.), the controller 70 switches to the second mode to automatically force the front derailleur 42 and the rear derailleur 44 to operate in accordance with the predetermined parameter under the emergency shift mode.

If the user operated input 74a is pushed to the left for the second operating amount A2 while in the shift setting mode (i.e., the first mode), then the controller 70 detects the second input has been performed. Upon detecting the second input has been performed, the controller 70 switches from the first mode to the second mode. Here, the controller 70 has an auxiliary user shifting mode (i.e., the second mode) as the default second mode. The auxiliary shift mode (i.e., the second mode) allows the user to shift one or both of the front and rear derailleurs 42 and 44 by operating the user operated input 74a. The front derailleur 42 and/or the rear derailleur 44 is operated based on the shift setting set in the shift setting mode. The user shift setting M is the default setting. Now, if the user operated input 74a is pushed to the left for the first operating amount A1 to perform the first input, then the controller 70 detects the first input has been perform while in the auxiliary user shifting mode (i.e., the second mode). Each subsequent one of the first inputs (i.e., inputs of the first operating amount A1) changes controls the actuator of the front derailleur 42 and/or the rear derailleur 44 based on the shift setting set in the shift setting mode. Here, in the auxiliary shift mode, the user decreases the gear ratio by pushing the user operated input 74a to the left for the first operating amount A1 to perform the first input, and the user increases the gear ratio by twice pushing the user operated input 74a to the left for the first operating amount A1 within 1.5 seconds.

In the case of FIGS. 13 to 15, the user can switch between different ones of the first modes or different ones of the second modes using by pushing the user operated input 74a to the right as shown in FIG. 10. Thus, when the controller 70 is in the first mode, pushing the user operated input 74a to the right will cause the controller 70 to switch between different ones of the first modes similar to FIG. 11. Similarly, when the controller 70 is in the second mode, pushing the user operated input 74a to the right will cause the controller 70 to switch between different ones of the second modes similar to FIG. 12.

In yet another case, as seen in FIGS. 5 and 16 to 18, the controller 70 can be set so that the first input is applied to the user interface 74 with a movement in a first operating direction D1, and the second input is applied to the user interface 74 with a movement in a second operating direction D2 that is different from the first operating direction D1. For example, when the user operated input 74a is pushed from the center rest position shown in FIG. 5 to the left (i.e., the first operating direction D1) as shown in FIG. 16 and then releasing the user operated input 74a within 1.0 second or less, a signal is sent to the controller 70 indicating the first input was inputted by the user. On the other hand, when the user operated input 74a is pushed from the center rest position shown in FIG. 5 to the right (i.e., the second operating direction D2) as shown in FIG. 17 and then releasing the user operated input 74a within 1.0 second or less, a signal is sent to the controller 70 indicating the second input was inputted by the user. In other words, the controller 70 is set to determine the first input was inputted by the user upon detecting the user operated input 74a being pushed from the center rest position to the left (i.e., the first operating direction D1) for 1.0 second or less, and to determine the second input was inputted by the user upon detecting the user operated input 74a being pushed from the center rest position to the right. (i.e., the second operating direction D2) for 1.0 second or less. Thus, based on the operating direction of the user operated input 74a being pushed, the controller 70 determines whether the first input or the second input was inputted by the user. The operating directions D1 and D2 are not limited to left and right as in the illustrated embodiment. For example, the operating directions D1 and D2 can be up and down, along arcs, any different movement along longitudinal and/or perpendicular directions or the likes.

In the case of FIGS. 16 to 18, the user can switch between different ones of the first modes using by pushing the user operated input 74a to the left as shown in FIG. 16 and holding the user operated input 74a in that position for more than 1.0 second. Thus, when the controller 70 is in the first mode, pushing the user operated input 74a to the right for more than 1.0 second will cause the controller 70 to switch between different ones of the first modes similar to FIG. 11. Similarly, the user can switch between different ones of the second modes using by pushing the user operated input 74*a* to the right as shown in FIG. 17 and holding the user operated input 74*a* in that position for more than 1.0 second. Thus, when the controller 70 is in the second mode, pushing the user operated input 74*a* to the right for more than 1.0 second will cause the controller 70 to switch between different ones of the second modes similar to FIG. 12.

Figure 19:
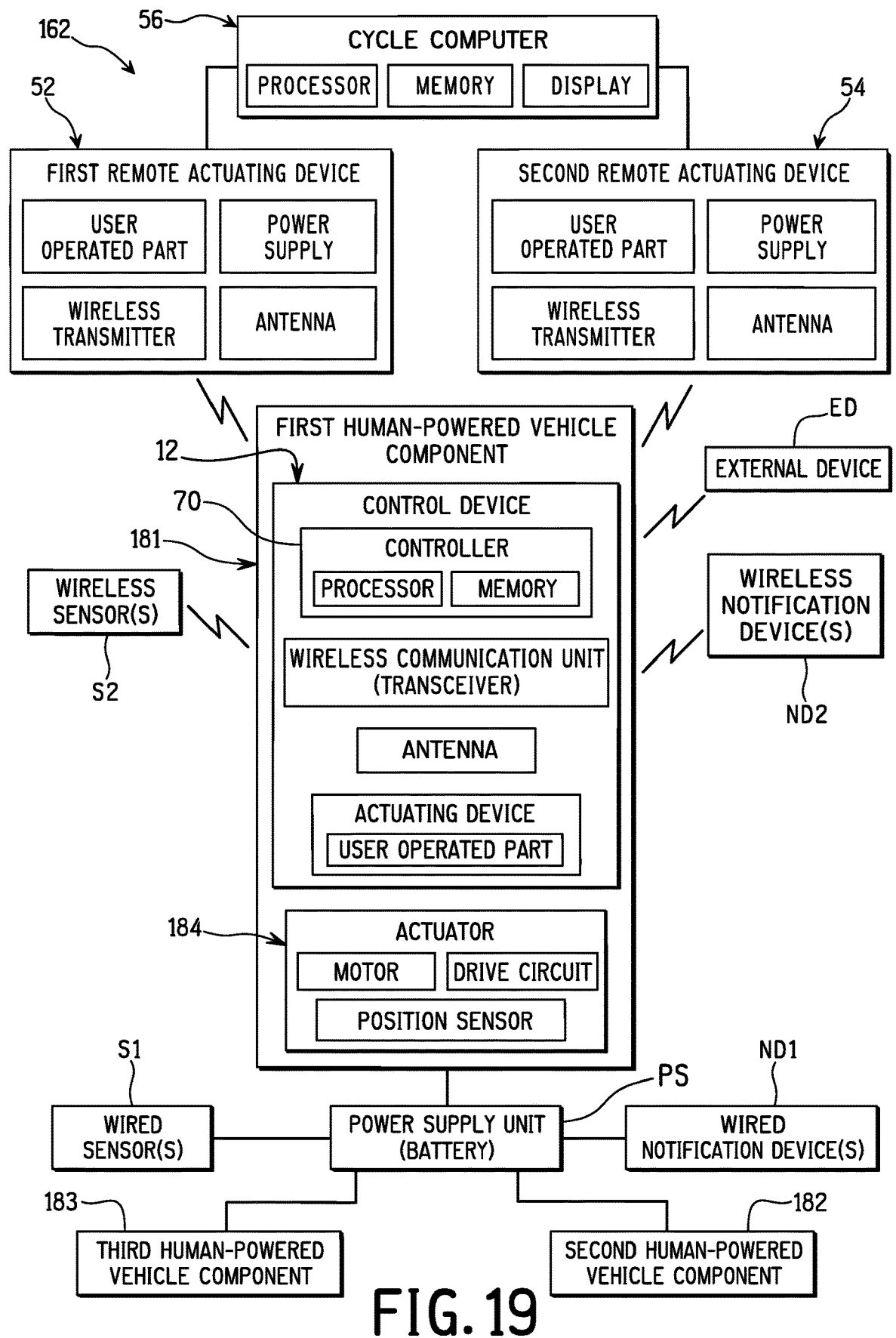
FIG. 19 is an overall block diagram showing another example of the control system for the human-powered vehicle illustrated in FIGS. 1 and 2.

Referring now to FIG. 19, a modified control system 162 in accordance with a second embodiment will now be explained. The main difference between the first and second embodiments is that a separate and independent control device is not used in the second embodiment. In other words, in the first embodiment, the control device 12 is a separate and independent component from the components 24, 28, 30, 32, 42, 44, 46, 48 and 50 that are part of the wired system connected to the power supply unit PS, while in the second embodiment, one of the components 24, 28, 30, 32, 42, 44, 46, 48 and 50 includes the control device 12. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, in the second embodiment, one of the components 24, 28, 30, 32, 42, 44, 46, 48 and 50 constitutes a first human-powered vehicle component 181 (e.g., the seatpost assembly 30), another one of the components 24, 28, 30, 32, 42, 44, 46, 48 and 50 constitutes a second human-powered vehicle component 182 (e.g., the front derailleur 42) and yet another one of the components 24, 28, 30, 32, 42, 44, 46, 48 and 50 constitutes a third human-powered vehicle component 183 (e.g., the rear derailleur 44). Here the first human-powered vehicle component 181 includes an actuator 184. The actuator 184 controls a valve or a chain guide depending on the configuration of the first human-powered vehicle component 181.

The operations of the controller 70 in the second embodiment are the same as in the first embodiment. Namely, the controller 70 in the second embodiment has the first mode which is a user input mode and the second mode which is an automatic mode. In the first mode (user input mode), the controller 70 operates based on user inputs other than using the first and second remote actuating devices 52 and 54. In the second mode, the controller 70 automatically operates one or more of the components 24, 28, 30, 32, 42, 44, 46, 48, 50 and 56 without either one of the first remote actuating device 52 and the second remote actuating device 54 being operated. As previously mentioned, the controller 70 switches to the second mode in response to the second input (either a user input or a predetermined condition). Preferably, one or both of the first and second LED indicators 74*b* and 74*c* is activated when the controller 70 switches from the first mode to the second mode based on a predetermined switching condition existing or based on the second input being a user input. Of course, it will be apparent from this disclosure that any indicating device can be used to indicate that the switching mode is taking place.

When the controller 70 switches to the second mode, the controller 70 automatically sets one or more of the components 24, 28, 30, 32, 42, 44, 46, 48, 50 and 56 to a predetermined setting, which can be preset and prestored by the user using the external device ED. For example, the front and rear suspensions 24 and 28 are automatically set to a predetermined stiffness by the controller 70, the seatpost ASP is automatically set to a predetermined height by the controller 70, the lamp 32 is automatically set to a desired output by the controller 70, the front and rear derailleurs 42 and 44 are automatically set to a predetermined parameter by the controller 70, the drive assist unit 46 is automatically set to a desired drive assist (e.g., Normal setting) by the controller 70, the front and rear brake devices 48 and 50 are automatically set to a predetermined braking responsiveness by the controller 70, and the display device 56*c* of the cycle computer 56 is automatically set to a desired screen display by the controller 70. The external device ED can be used to change a manufacturer's default setting of one or more of the components 24, 28, 30, 32, 42, 44, 46, 48, 50 and 56 to a user preferred setting or another prestored setting.

Also, in the second mode, each of the components 24, 28, 30, 32, 42, 44, 46, 48, 50 and 56 can be individually operated by the user in the same way as in the first embodiment. Namely, the user interface 74 is used by the user to manually adjust each of the components 24, 28, 30, 32, 42, 44, 46, 48, 50 and 56 as mentioned above with respect to the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the control system. Accordingly, these directional terms, as utilized to describe the control system should be interpreted relative to a bicycle in an upright riding position on a horizontal surface and that is equipped with the control system. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control device for a human-powered vehicle, the control device comprising:
    a controller configured to activate at least one component of the human-powered vehicle in response to a user operation of at least one remote actuating device and further configured to operate the at least one component of the human-powered vehicle in at least a first mode and a second mode based on a first input that does not include the user operation of the at least one remote actuating device,
    the controller being connected to the at least one component of the human-powered vehicle such that, in the first mode, the controller is configured to activate the at least one component based on the first input, and in the second mode, the controller is configured to automatically operate at least one of an actuator and an indicator based on the first input,
    the first mode being switched into the second mode based on a second input different from the first input, and
    the second mode configured to allow manual operation of the at least one component.

2. The control device according to claim 1, further comprising
    a user interface, wherein
    the controller is configured to switch from the first mode into the second mode based on the second input applied to the user interface.

3. The control device according to claim 2, wherein
    the first input is applied to the user interface with a first operating duration, and
    the second input is applied to the user interface with a second operating duration different from the first operating duration.

4. The control device according to claim 2, wherein
    the first input is applied to the user interface with a movement in a first operating direction, and
    the second input is applied to the user interface with a movement in a second operating direction different from the first operating direction.

5. The control device according to claim 2, wherein
    the first input is applied to the user interface with a first operating amount, and
    the second input is applied to the user interface with a second operating amount different from the first operating amount.

6. The control device according to claim 1, wherein
    the controller is configured to switch from the first mode to the second mode upon detecting a predetermined condition of the human powered vehicle.

7. The control device according to claim 6, further comprising
    a user interface, wherein
    the actuator is operated based on an operation of the user interface in the second mode.

8. A control system comprising the control device according to claim 1, the control system further comprising
    the at least one component of the human-powered vehicle.

9. The control system according to claim 8, wherein
    the at least one component includes one of a transmission, a suspension, a seatpost assembly, a brake device, and a drive assist unit that is operated by the actuator.

10. The control system according to claim 9, wherein
    the at least one component includes the transmission which includes a chain guide that is operated by the actuator.

11. The control system according to claim 9, wherein
    the at least one component includes the suspension which includes a valve that is operated by the actuator.

12. The control system according to claim 9, wherein
    the at least one component includes the seatpost assembly which includes a valve that is operated by the actuator.

13. The control system according to claim 9, wherein
    the actuator is provided to the one of the transmission, the suspension, the seatpost assembly, the brake device, and the drive assist unit.

14. The control system according to claim 8, wherein
    the at least one component includes one of a lamp and a display device.

15. The control system according to claim 14, wherein
    the indicator is provided to one of the lamp and the display device.

16. The control system according to claim 8, further comprising
    an additional control device configured to operate the at least one component based on a user input while in the first mode, the user input being different from the first and second inputs,
    the controller of the control device being configured to switch from the first mode to the second mode upon detecting disconnection between the additional control device and the at least one component.

17. The control system according to claim 8, further comprising a wireless communication unit electrically connected to the controller of the control device.

18. The control system according to claim 8, further comprising
a power supply unit electrically connected to the controller of the control device.

19. The control system according to claim 18, wherein the power supply unit is electrically connected to the at least one component.

20. A control system for a human-powered vehicle, the control system comprising:
at least one component of the human-powered vehicle; and
a control device, the control device comprising:
a controller configured to operate the at least one component of the human-powered vehicle in at least a first mode and a second mode,
the controller being connected to the at least one component of the human-powered vehicle such that, in the first mode, the controller is configured to activate the at least one component based on a first input that does not include a user operation of at least one remote actuating device, and in the second mode, the controller is configured to automatically operate at least one of an actuator and an indicator based on the first input,
the first mode being switched into the second mode based on a second input different from the first input, and
the second mode configured to allow manual operation of the at least one component.

* * * * *